United States Patent
Choi et al.

(10) Patent No.: US 11,770,827 B2
(45) Date of Patent: Sep. 26, 2023

(54) METHOD AND APPARATUS FOR TRANSMITTING AND RECEIVING SIGNAL IN WIRELESS COMMUNICATION SYSTEM

(71) Applicant: LG ELECTRONICS INC., Seoul (KR)

(72) Inventors: Seunghwan Choi, Seoul (KR); Seonwook Kim, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/165,273

(22) Filed: Feb. 6, 2023

(65) Prior Publication Data

US 2023/0189264 A1    Jun. 15, 2023

Related U.S. Application Data

(63) Continuation of application No. PCT/KR2021/010434, filed on Aug. 6, 2021.

(30) Foreign Application Priority Data

Aug. 6, 2020  (KR) .................. 10-2020-0098859
Oct. 15, 2020  (KR) .................. 10-2020-0133773

(Continued)

(51) Int. Cl.
*H04W 72/1273* (2023.01)
*H04W 72/566* (2023.01)
(Continued)

(52) U.S. Cl.
CPC ....... *H04W 72/1273* (2013.01); *H04L 5/0051* (2013.01); *H04W 72/23* (2023.01); *H04W 72/566* (2023.01)

(58) Field of Classification Search
CPC .. H04L 5/0051; H04W 72/23; H04W 72/566; H04W 72/1273
(Continued)

(56) References Cited

FOREIGN PATENT DOCUMENTS

WO   WO-2021245632 A1 * 12/2021
WO   WO-2023031794 A1 *  3/2023

* cited by examiner

*Primary Examiner* — Peter G Solinsky
(74) *Attorney, Agent, or Firm* — LEE, HONG, DEGERMAN, KANG & WAIMEY PC

(57) ABSTRACT

Provided are a method and apparatus for transmitting and receiving a signal in a wireless communication system, according to an embodiment of the present disclosure, the method comprising the steps of: receiving information indicating a demodulation-reference signal (DM-RS) port related to transmission of a physical uplink shared channel (PUSCH); and transmitting the PUSCH and a DM-RS on the basis of the information. Provided are a method and apparatus for transmitting and receiving a signal in a wireless communication system, according to another embodiment of the present disclosure, the method comprising the steps of: receiving information indicating a demodulation-reference signal (DM-RS) port related to reception of a physical downlink shared channel (PDSCH); and receiving the PDSCH and a DM-RS on the basis of the information. On the basis of a determination about a frequency domain orthogonal cover code (OCC) being not applied to the DM-RS port indicated by the information, the DM-RS may be transmitted after a change operation for the DM-RS port.

12 Claims, 14 Drawing Sheets

Receiving information indicating a DM-RS port related to transmission of a PUSCH — S1001

Transmitting the PUSCH and a DM-RS based on the information — S1003

(30) Foreign Application Priority Data

Jan. 14, 2021 (KR) .......................... 10-2021-0005607
Apr. 5, 2021 (KR) .......................... 10-2021-0044287

(51) Int. Cl.
*H04W 72/23* (2023.01)
*H04L 5/00* (2006.01)

(58) Field of Classification Search
USPC .......................................................... 370/329
See application file for complete search history.

Fig. 4

|RE index|0|1|2|3|4|5|6|7|8|9|10|11|
|---|---|---|---|---|---|---|---|---|---|---|---|---|
|1st OFDM| |RS| | | |RS| | | |RS| | |
|2nd OFDM| | | |RS| | | |RS| | | |RS|

| RE index | 0 | 1 | 2 | 3 | 4 | 5 | 6 | 7 | 8 | 9 | 10 | 11 |
|---|---|---|---|---|---|---|---|---|---|---|---|---|
| 1st OFDM | | RS | RS | RS | | RS | RS | RS | | RS | RS | RS |
| 2nd OFDM | | | | | | | | | | | | |
| 3rd OFDM | | | | | | | | | | | | |

| RE index | 0 | 1 | 2 | 3 | 4 | 5 | 6 | 7 | 8 | 9 | 10 | 11 |
|---|---|---|---|---|---|---|---|---|---|---|---|---|
| 1st OFDM | RS |  | RS |  | RS |  | RS |  | RS |  | RS |  |
| 2nd OFDM |  |  |  |  |  |  |  |  |  |  |  |  |

METHOD AND APPARATUS FOR TRANSMITTING AND RECEIVING SIGNAL IN WIRELESS COMMUNICATION SYSTEM

CROSS-REFERENCE TO RELATED APPLICATIONS

This application is a continuation of International Application No. PCT/KR2021/010434, filed on Aug. 6, 2021, which claims the benefit of earlier filing date and right of priority to Korean Application Nos. 10-2020-0098859, filed on Aug. 6, 2020, 10-2020-0133773, filed on Oct. 15, 2020, 10-2021-0005607, filed on Jan. 14, 2021, and 10-2021-0044287, filed on Apr. 5, 2021, the contents of which are all hereby incorporated by reference herein in their entireties.

The present disclosure relates to a method and apparatus for use in a wireless communication system.

BACKGROUND

Generally, a wireless communication system is developing to diversely cover a wide range to provide such a communication service as an audio communication service, a data communication service, and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

SUMMARY

The object of the present disclosure is to provide a signal transmission and reception method for efficiently transmitting and receiving a reference signal in a wireless communication system and apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving a signal in a wireless communication system.

In an aspect of the present disclosure, there is provided a method of transmitting and receiving a signal by a user equipment (UE) in a wireless communication system. The method may include: receiving information indicating a demodulation reference signal (DM-RS) port related to transmission of a physical uplink shared channel (PUSCH); and transmitting the PUSCH and a DM-RS based on the information. Based on a determination that a frequency-domain orthogonal cover code (OCC) is not applied to the DM-RS port indicated by the information, the DM-RS may be transmitted after a change operation for the DM-RS port.

In another aspect of the present disclosure, there are provided an apparatus, a processor, and a storage medium for performing the signal transmission and reception method.

In the methods and apparatuses, the change operation may correspond to, based on the information indicating a first DM-RS port and a second DM-RS port, an operation of configuring to use only the second DM-RS port among the first DM-RS port and the second DM-RS port. Alternatively, the operation may correspond to, based on the information indicating the first DM-RS port and the second DM-RS port, an operation of configuring to use the first DM-RS port and a third DM-RS port except for the second DM-RS port. Alternatively, the operation may correspond to, based on the information indicating only the first DM-RS port, an operation of configuring to use the second DM-RS port rather than the first DM-RS port.

In the methods and apparatuses, the determination may be received through higher layer signaling and/or downlink control information (DCI) from a network. Alternatively, the determination may be based on a configured PUSCH mapping type, a configured DM-RS type, a configured phase tracking reference signal (PT-RS) pattern, a configured inter-carrier interference (ICI) compensation scheme, a configured subcarrier spacing (SCS), a configured modulation and coding scheme (MCS), a number of configured code division multiplexing (CDM) groups, a configured DM-RS port, and/or whether single-user multiple-input multiple-output (SU-MIMO) is configured.

In the methods and apparatuses, DM-RS ports belonging to a same CDM group as the DM-RS port may not be allocated to other UEs.

In the methods and apparatuses, that the DM-RS ports belonging to the same CDM group as the DM-RS port are not allocated to the other UEs may be indicated by: an unused antenna port field value based on a PT-RS configuration; an unused antenna port field value based on a rank for the PUSCH transmission being smaller than or equal to a specific rank; and/or an unused antenna port field value based on that CDM based on the frequency-domain OCC is not applied to the DM-RS ports belonging to the CDM group.

In the methods and apparatuses, the PUSCH transmission and the DM-RS transmission may be replaced with PDSCH reception and DM-RS reception, respectively. In this case, PUSCH-related configurations may be replaced with PDSCH-related configurations.

The apparatus may include an autonomous driving vehicle communicable with at least a UE, a network, and another autonomous driving vehicle other than the communication apparatus.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to one embodiment of the present disclosure, when a reference signal is exchanged between communication devices, an uplink channel may be efficiently transmitted based on operations, which are different from conventional ones.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 4 to 10 illustrate methods of transmitting and receiving a reference signal according to embodiments of the present disclosure.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

Figure 1:
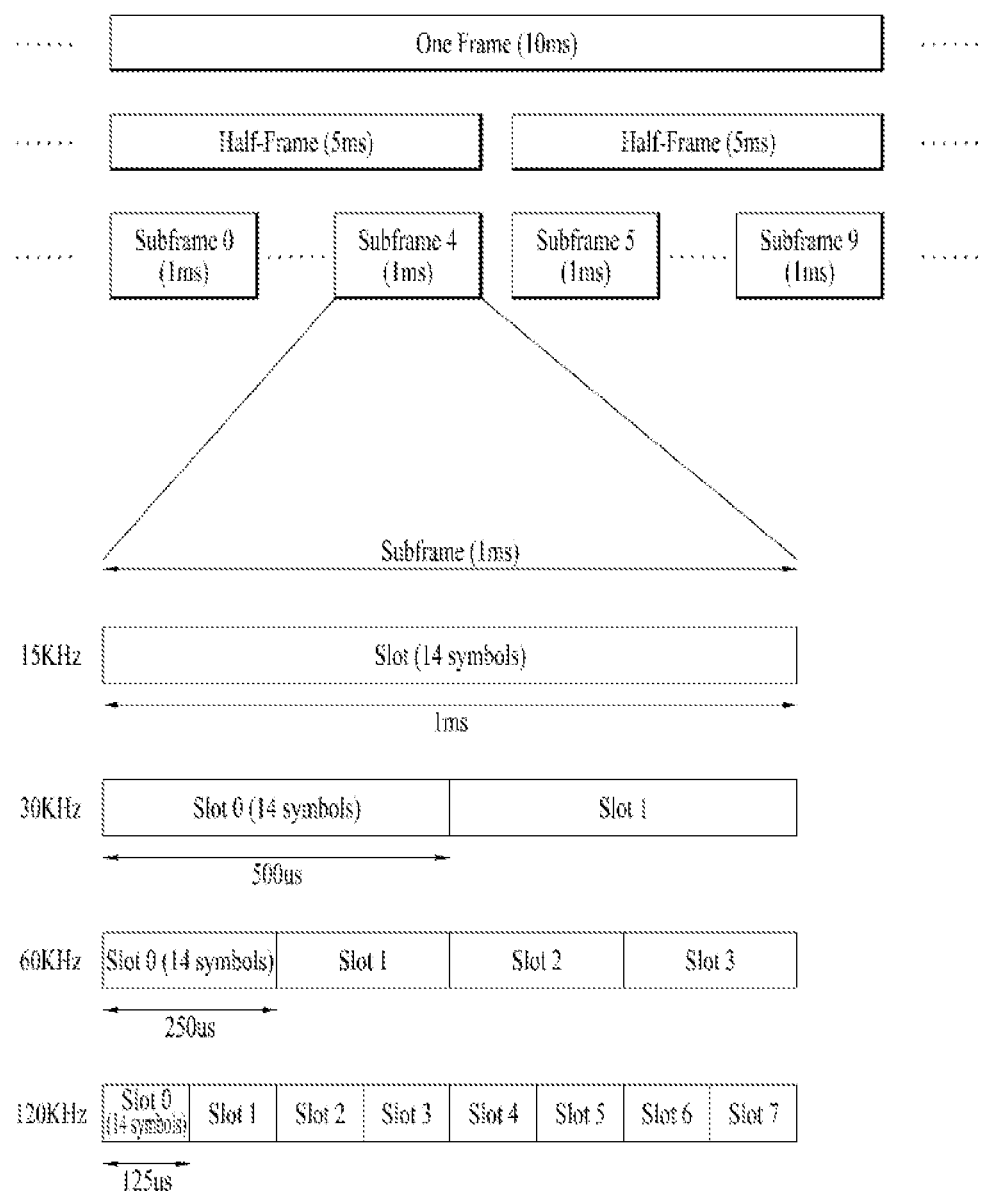
FIG. 1 illustrates a radio frame structure.

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS ($15*2^u$) | $N_{symb}^{slot}$ | $N_{slot}^{frame,u}$ | $N_{slot}^{subframe,u}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N_{symb}^{slot}$: number of symbols in a slot
*$N_{slot}^{frame,u}$: number of slots in a frame
*$N_{slot}^{subframe,u}$: number of slots in a subframe Table 2 illustrates that the number of symbols per slot, the number of slots per frame, and the number of slots per subframe vary according to SCSs in an extended CP case.

TABLE 2

| SCS ($15*2^u$) | $N_{symb}^{slot}$ | $N_{slot}^{frame,u}$ | $N_{slot}^{subframe,u}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz–7125 MHz | 15, 30, 60 kHz |
| FR2 | 24250 MHz–52600 MHz | 60, 120, 240 kHz |

Figure 2:
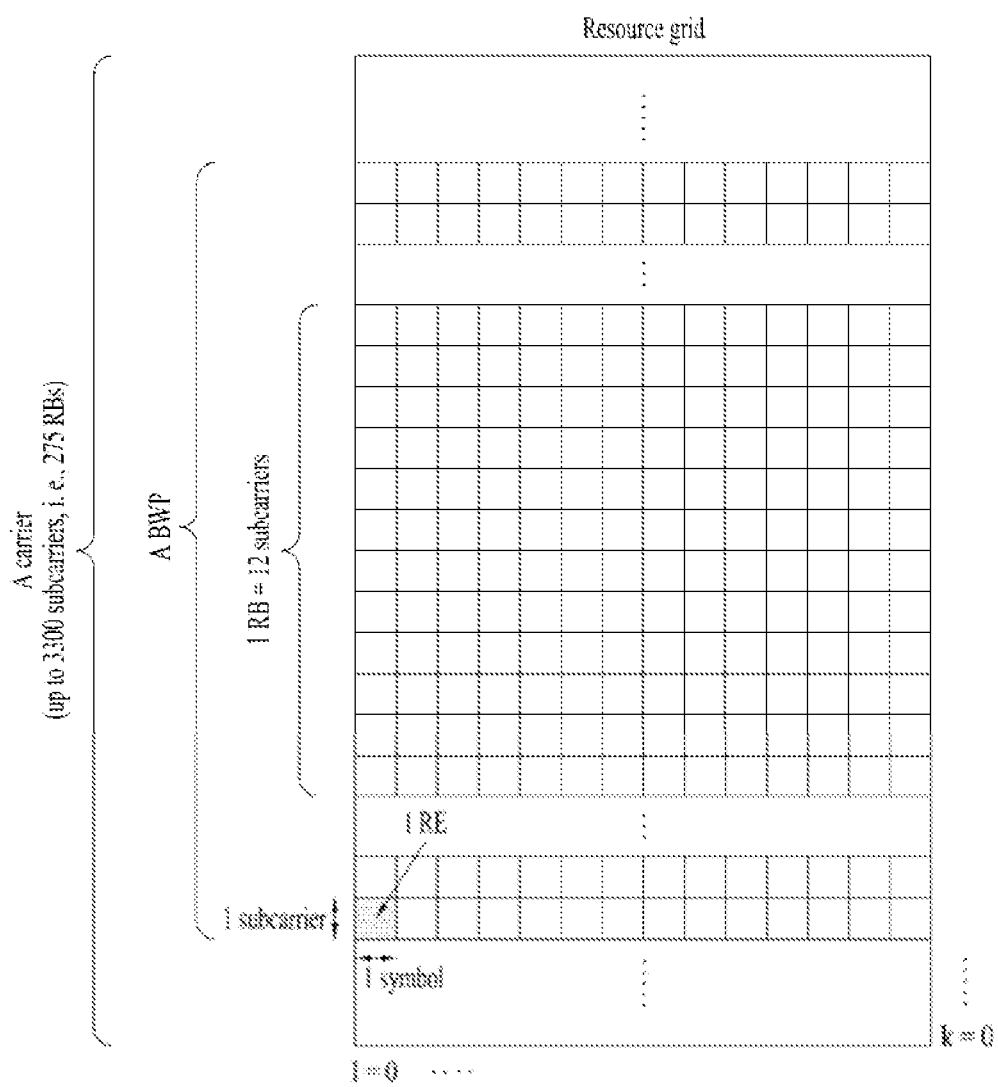
FIG. 2 illustrates a resource grid during the duration of a slot.

FIG. 2 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain.

A resource block (RB) may be defined by a plurality of (e.g., 12) consecutive subcarriers in the frequency domain. A plurality of RB interlaces (simply, interlaces) may be defined in the frequency domain. Interlace m∈{0, 1, ..., M−1} may be composed of (common) RBs {m, M+m, 2M+m, 3M+m, ...}. M denotes the number of interlaces. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

In a wireless communication system, a UE receives information from a BS in downlink (DL), and the UE transmits information to the BS in uplink (UL). The information exchanged between the BS and UE includes data and various control information, and various physical channels/signals are present depending on the type/usage of the information exchanged therebetween. A physical channel corresponds to a set of resource elements (REs) carrying information originating from higher layers. A physical signal corresponds to a set of REs used by physical layers but does not carry information originating from the higher layers. The higher layers include a medium access control (MAC) layer, a radio link control (RLC) layer, a packet data convergence protocol (PDCP) layer, a radio resource control (RRC) layer, and so on.

DL physical channels include a physical broadcast channel (PBCH), a physical downlink shared channel (PDSCH), and a physical downlink control channel (PDCCH). DL physical signals include a DL reference signal (RS), a primary synchronization signal (PSS), and a secondary synchronization signal (SSS). The DL RS includes a demodulation reference signal (DM-RS), a phase tracking reference signal (PT-RS), and a channel state information reference signal (CSI-RS). UL physical channel include a physical random access channel (PRACH), a physical uplink shared channel (PUSCH), and a physical uplink control channel (PUCCH). UL physical signals include a UL RS. The UL RS includes a DM-RS, a PT-RS, and a sounding reference signal (SRS).

Figure 3:
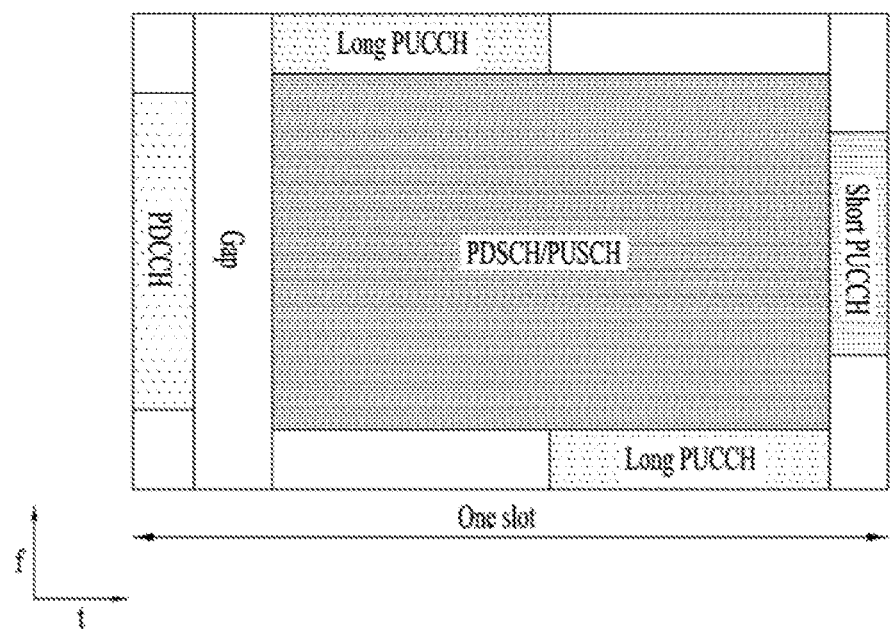
FIG. 3 illustrates a self-contained slot structure.

FIG. 3 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

In the present disclosure, a base station (BS) may be, for example, a gNode B (gNB).

DL Physical Channel/Signal (1) PDSCH

A PDSCH carries DL data (e.g., DL-shared channel transport block (DL-SCH TB)). The TB is coded into a codeword (CW) and then transmitted after scrambling and modulation processes. The CW includes one or more code blocks (CBs). One or more CBs may be grouped into one code block group (CBG). Depending on the configuration of a cell, the PDSCH may carry up to two CWs. Scrambling and modulation may be performed for each CW, and modulation symbols generated from each CW may be mapped to one or more layers. Each layer may be mapped to resources together with a DMRS after precoding and transmitted on a corresponding antenna port. The PDSCH may be dynamically scheduled by a PDCCH (dynamic scheduling). Alternatively, the PDSCH may be semi-statically scheduled based on higher layer (e.g., RRC) signaling (and/or Layer 1 (L1) signaling (e.g., PDCCH)) (configured scheduling (CS)). Therefore, in the dynamic scheduling, PDSCH transmission is accompanied by the PDCCH, whereas in the CS, PDSCH transmission may not be accompanied by the PDCCH. The CS may include semi-persistent scheduling (SPS).

(2) PDCCH

A PDCCH carries Downlink Control Information (DCI). For example, the PDCCH (i.e., DCI) may carry: transmission formats and resource allocation of a DL-SCH; frequency/time resource allocation information on an uplink shared channel (UL-SCH); paging information on a paging channel (PCH); system information on a DL-SCH; time/frequency resource allocation information on a higher layer control message such as a random access response (RAR) transmitted over a PDSCH; transmit power control commands; and information on activation/deactivation of SPS/CS. Various DCI formats may be provided depending on information in DCI.

Table 4 shows DCI formats transmitted over the PDCCH.

TABLE 4

| DCI format | Usage |
|---|---|
| 0_0 | Scheduling of PUSCH in one cell |
| 0_1 | Scheduling of one or multiple PUSCH in one cell, or indicating downlink feedback information for configured grant PUSCH (CG-DFI) |
| 1_0 | Scheduling of PDSCH in one cell |
| 1_1 | Scheduling of PDSCH in one cell, and/or triggering one shot HARQ-ACK codebook feedback |
| 2_0 | Notifying a group of UEs of the slot format, available RB sets, COT duration and search space set group switching |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a CBG-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or UL scheduling information. DCI format 2_0 may be used to provide dynamic slot format information (e.g., dynamic SFI) to the UE, and DCI format 2_1 may be used to provide downlink pre-emption information to the UE. UEs defined as one group may be provided with DCI format 2_0 and/or DCI format 2_1 over a group common PDCCH, which is a PDCCH defined for a group of UEs.

The PDCCH/DCI may include a cyclic redundancy check (CRC), and the CRC may be masked/scrambled with various identifiers (e.g., radio network temporary identifier (RNTI)) according to the owner or purpose of the PDCCH. For example, if the PDCCH is for a specific UE, the CRC may be masked with a cell-RNTI (C-RNTI). If the PDCCH relates to paging, the CRC may be masked with a paging-RNTI (P-RNTI). If the PDCCH relates to system information (e.g., system information block (SIB)), the CRC may be masked with a system information RNTI (SI-RNTI). If the PDCCH relates to a random access response, the CRC may be masked with a random access-RNTI (RA-RNTI).

Table 5 shows the usage of the PDCCH and transport channels according to the type of RNTI. Here, the transport channel means a transport channel related to data carried by a PDSCH/PUSCH scheduled by the PDCCH.

significant bit (MSB) of the bitmap corresponds to the first RB group in the BWP. An RB group corresponding to a bit with a value of 1 may be allocated as a frequency-domain resource of the CORESET.

duration: this parameter/information indicates time-domain resources of the CORESET. The parameter/information duration may indicate the number of consecutive OFDMA symbols included in the CORESET. For example, duration has a value of 1-3.

cce-REG-MappingType: this parameter/information indicates a CCE-to-REG mapping type. An interleaved type and a non-interleaved type may be supported.

precoderGranularity: this parameter/information indicates a precoder granularity in the frequency domain.

TABLE 5

| RNTI | Usage | Transport Channel |
|---|---|---|
| P-RNTI | Paging and System Information change notification | PCH(Paging Channel) |
| SI-RNTI | Broadcast of System Information | DL-SCH |
| RA-RNTI | Random Access Response | DL-SCH |
| Temporary C-RNTI | Contention Resolution (when no valid C-RNTI is available) | DL-SCH |
| Temporary C-RNTI | Msg3 transmission | UL-SCH |
| C-RNTI, MCS(Modulation and Coding Scheme)-C-RNTI | Dynamically scheduled unicast transmission | UL-SCH |
| C-RNTI | Dynamically scheduled unicast transmission | DL-SCH |
| MCS-C-RNTI | Dynamically scheduled unicast transmission | DL-SCH |
| C-RNTI | Triggering of PDCCH ordered random access | N/A |
| CS(Configued Scheduling)-RNTI | Configured scheduled unicast transmission (activation, reactivation and retransmission) | DL-SCH, UL-SCH |
| CS-RNTI | Configured scheduled unicast transmission (deactivation) | N/A |
| TPC(Transmit Power Control)-PUCCH-RNTI | PUCCH power control | N/A |
| TPC-PUSCH-RNTI | PUSCH power control | N/A |
| TPC-SRS-RNTI | SRS trigger and power control | N/A |
| INT(Interruption)-RNTI | Indication pre-emption in DL | N/A |
| SFI(Slot Format Indication)-RNTI | Slot Format Indication on the given cell | N/A |
| SP(Semi-persistent)-CSI(Channel State Information)-RNTI | Activation of Semi-persistent CSI reporting on PUSCH | N/A |

For the PDCCH, a fixed modulation scheme may be used (e.g., quadrature phase shift keying (QPSK)). One PDCCH may include 1, 2, 4, 8, or 16 control channel elements (CCEs) depending on the aggregation level (AL). One CCE may include 6 resource element groups (REGs), and one REG may be defined by one OFDMA symbol and one (P)RB.

The PDCCH may be transmitted in a control resource set (CORESET). The CORESET corresponds to a set of physical resources/parameters used to carry the PDCCH/DCI within a BWP. For example, the CORESET may include a set of REGs with a given numerology (e.g., SCS, CP length, etc.). The CORESET may be configured by system information (e.g., MIB) or UE-specific higher layer (e.g., RRC) signaling. For example, the following parameters/information may be used to configure the CORESET. One UE may be configured with one or more CORESETs, and a plurality of CORESETs may overlap in the time/frequency domain.

controlResourceSetId: this parameter/information indicates the identifier (ID) of the CORESET.

frequencyDomainResources: this parameter/information indicates frequency-domain resources of the CORESET. The frequency-domain resources may be indicated by a bitmap, and each bit corresponds to an RB group (=6 consecutive RBs). For example, the most tci-StatesPDCCH: this parameter/information indicates information (e.g., TCI-StateID) on a transmission configuration indication (TCI) state for the PDCCH. The TCI state may be used to provide a quasi-co-location (QCL) relationship between DL RS(s) in an RS set (TCI-state) and a PDCCH DMRS port.

tci-PresentInDCI: this parameter/information indicates whether a TCI field is included in DCI.

pdcch-DMRS-ScramblingID: this parameter/information indicates information used for initialization of a PDCCH DMRS scrambling sequence.

For PDCCH reception, the UE may monitor (e.g., blind decoding) a set of PDCCH candidates in the CORESET. The PDCCH candidate may mean CCE(s) monitored by the UE for PDCCH reception/detection. PDCCH monitoring may be performed in one or more CORESETs in an active DL BWP on each active cell in which the PDCCH monitoring is configured. The set of PDCCH candidates monitored by the UE may be defined as a PDCCH search space (SS) set. The SS set may be classified into a common search space (CSS) set or a UE-specific search space (USS) set.

Table 6 shows PDCCH search spaces.

TABLE 6

| Search Space | Type | RNTI | Use Case |
| --- | --- | --- | --- |
| Type0-PDCCH | Common | SI-RNTI on a primary cell | Broadcast of System Information |
| Type0A-PDCCH | Common | SI-RNTI on a primary cell | Broadcast of System Information |
| Type1-PDCCH | Common | RA-RNTI or TC-RNTI on a primary cell | Msg2, Msg4 in RACH |
| Type2-PDCCH | Common | P-RNTI on a primary cell | Paging System Information change notification |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI or CS-RNTI | Group signaling |
| UE Specific | UE Specific | C-RNTI, MCS-C-RNTI or CS-RNTI | UE signaling (e.g., PDSCH/PUSCH) |

The SS set may be configured by system information (e.g., MIB) or UE-specific higher layer (e.g., RRC) signaling. S (e.g., 10) SS sets or less may be configured in each DL BWP of a serving cell. For example, the following parameters/information may be provided for each SS set. Each SS set may be associated with one CORESET, and each CORESET configuration may be associated with one or more SS sets.

searchSpaceId: this parameter/information indicates the ID of the SS set.

controlResourceSetId: this parameter/information indicates the CORESET associated with the SS set.

monitoringSlotPeriodicityAndOffset: this parameter/information indicates a PDCCH monitoring periodicity (in a unit of slot) and a PDCCH monitoring offset (in a unit of slot)

monitoringSymbolsWithinSlot: this parameter/information indicates first OFDMA symbol(s) for PDCCH monitoring in a slot in which the PDCCH monitoring is configured. The first OFDMA symbol(s) are indicated by a bitmap, and each bit corresponds to each OFDMA symbol in the slot. The MSB of the bitmap corresponds to the first OFDM symbol in the slot. OFDMA symbol(s) corresponding to bit(s) with a value of 1 corresponds to the first symbol(s) in the CORESET in the slot.

nrofCandidates: this parameter/information indicates the number of PDCCH candidates (e.g., one of 0, 1, 2, 3, 4, 5, 6, and 8) for each AL (where AL={1, 2, 4, 8, 16}).

searchSpaceType: this parameter/information indicates whether the SS type is the CSS or USS.

DCI format: this parameter/information indicates the DCI format of a PDCCH candidate.

The UE may monitor PDCCH candidates in one or more SS sets in a slot according to the configuration of the CORESET/SS set. An occasion (e.g., time/frequency resource) to monitor PDCCH candidates is defined as a PDCCH (monitoring) occasion. One or more PDCCH (monitoring) occasions may be configured within a slot.

UL Physical Channels/Signals (1) PUSCH

A PUSCH may carry UL data (e.g., uplink shared channel (UL-SCH) transport block (TB)) and/or uplink control information (UCI). The PUSCH may be transmitted based on a cyclic prefix orthogonal frequency division multiplexing (CP-OFDM) waveform or a discrete Fourier transform spread OFDM (DFT-s-OFDM) waveform. When the PUSCH is transmitted based on the DFT-s-OFDM waveform, the UE may transmit the PUSCH by applying transform precoding. For example, when the transform precoding is not allowed (e.g., when the transform precoding is disabled), the UE may transmit the PUSCH based on the CP-OFDM waveform. When the transform precoding is allowed (e.g., when the transform precoding is enabled), the UE may transmit the PUSCH based on the CP-OFDM waveform or DFT-s-OFDM waveform. PUSCH transmission may be dynamically scheduled by a PDCCH (dynamic scheduling) or semi-statically scheduled by higher layer signaling (e.g., RRC signaling) (and/or Layer 1 (L1) signaling (e.g., PDCCH)) (configured scheduling (CS)). Therefore, in the dynamic scheduling, the PUSCH transmission may be associated with the PDCCH, whereas in the CS, the PUSCH transmission may not be associated with the PDCCH. The CS may include PUSCH transmission based on a Type-1 configured grant (CG) and PUSCH transmission based on a Type-2 CG. For the Type-1 CG, all parameters for PUSCH transmission may be signaled by the higher layer. For the Type-2 CG, some parameters for PUSCH transmission may be signaled by higher layers, and the rest may be signaled by the PDCCH. Basically, in the CS, the PUSCH transmission may not be associated with the PDCCH.

(2) PUCCH

A PUCCH may carry UCI. The UCI includes the following information.

Scheduling request (SR): The SR is information used to request a UL-SCH resource.

Hybrid automatic repeat and request acknowledgement) (HARQ-ACK): The HARQ-ACK is a signal in response to reception of a DL signal (e.g., PDSCH, SPS release PDCCH, etc.). The HARQ-ACK response may include positive ACK (ACK), negative ACK (HACK), DTX (Discontinuous Transmission), or NACK/DTX. The HARQ-ACK may be interchangeably used with A/N, ACK/NACK, HARQ-ACK/NACK, and the like. The HARQ-ACK may be generated on a TB/CBG basis.

Channel Status Information (CSI): The CSI is feedback information on a DL channel. The CSI includes a channel quality indicator (CQI), a rank indicator (RI), a precoding matrix indicator (PMI), a precoding type indicator (PTI), and so on.

Table 7 shows PUCCH formats. The PUCCH formats may be classified according to UCI payload sizes/transmission lengths (e.g., the number of symbols included in a PUCCH resource) and/or transmission structures. The PUCCH formats may be classified into short PUCCH formats (PUCCH formats 0 and 2) and long PUCCH formats (PUCCH formats 1, 3, and 4) according to the transmission lengths.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

(0) PUCCH Format 0 (PF0)
Supportable UCI payload size: up to K bits (e.g., K=2)
Number of OFDM symbols included in one PUCCH: 1 to X symbols (e.g., X=2)
Transmission structure: only a UCI signal is configured with no DM-RS, and a UCI state is transmitted by selecting and transmitting one of a plurality of sequences.

(1) PUCCH Format 1 (PF1)
Supportable UCI payload size: up to K bits (e.g., K=2)
Number of OFDM symbols included in one PUCCH: Y to Z symbols (e.g., Y=4 and Z=14)
Transmission structure: UCI and a DM-RS are configured in different OFDM symbols based on time division multiplexing (TDM). For the UCI, a specific sequence is multiplied by a modulation symbol (e.g., QPSK symbol). A cyclic shift/orthogonal cover code (CS/OCC) is applied to both the UCI and DM-RS to support code division multiplexing (CDM) between multiple PUCCH resources (complying with PUCCH format 1) (in the same RB).

(2) PUCCH Format 2 (PF2)
Supportable UCI payload size: more than K bits (e.g., K=2)
Number of OFDM symbols included in one PUCCH: 1 to X symbols (e.g., X=2)
Transmission structure: UCI and a DMRS (DM-RS) are configured/mapped in/to the same symbol based on frequency division multiplexing (FDM), and encoded UCI bits are transmitted by applying only an inverse fast Fourier transform (IFFT) thereto with no DFT.

(3) PUCCH Format 3 (PF3)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. Encoded UCI bits are transmitted by applying a DFT thereto. To support multiplexing between multiple UEs, an OCC is applied to the UCI, and a CS (or interleaved frequency division multiplexing (IFDM) mapping) is applied to the DM-RS before the DFT.

(4) PUCCH Format 4 (PF4 or F4)
Supportable UCI payload size: more than K bits (e.g., K=2)
Number of OFDM symbols included in one PUCCH: Y to Z symbols (e.g., Y=4 and Z=14)
Transmission structure: UCI and a DMRS are configured/mapped in/to different symbols based on TDM. The DFT is applied to encoded UCI bits with no multiplexing between UEs.

1. Reference Signal in High Frequency Band

The above contents are applicable in combination with methods proposed in the present disclosure, which will be described later. Alternatively, the contents may clarify the technical features of the methods proposed in the present disclosure.

In addition, the following methods may be equally applied to the above-described NR system or shared spectrum (licensed bands). Thus, it is obvious that the terms, expressions, and structures in this document may be modified to be suitable for the system in order to implement the technical idea of the present disclosure in the corresponding system.

The NR system supports various numerologies (or SCSs) to provide various 5G services. For example, the NR system may support a wide area in conventional cellular bands with an SCS of 15 kHz and support a dense urban area and a wide carrier bandwidth with lower latency with an SCS of 30/60 kHz. For an SCS above 60 kHz, NR may support a bandwidth of 24.25 GHz or higher. According to Release 16, NR frequency bands are divided into two frequency ranges (FR1 and FR2), which may be configured as shown in Table 3. In addition, discussions are ongoing to support future NR systems operating above frequency bands defined in FR1/FR2 (for example, 52.6 GHz to 71 GHz).

Frequency bands above FR1 and FR2 (e.g., bands from 52.6 GHz to 114.25 GHz, and more particularly, bands from 52.6 GHz to 71 GHz) may be referred to as FR3. The waveforms, SCSs, CP lengths, timings, etc. defined for FR1 and FR2 in the current NR system may not be applied to FR3.

In NR, a DM-RS may be used for control and data channels to perform coherent demodulation. The DM-RS may be inserted into resources allocated for the control/data channels and used for channel estimation for synchronous demodulation. Fixed patterns are defined according to control/data channels or used waveforms. For NR operation, the network may select one of the defined DM-RS patterns so that the interval between adjacent DM-RSs in the frequency domain may be set smaller than the coherence bandwidth of a channel. Accordingly, the receiver may stably perform channel estimation.

In NR systems operating in frequency bands above FR2 (e.g., bands from 52.6 GHz to 71 GHz), the effect of phase noise may relatively increase, and thus a new numerology may be introduced to compensate for the phase noise effect. For example, the SCS may be greater than 240 kHz. In addition, the SCS may be 480 kHz or 960 kHz. Thus, if DM-RS patterns defined in conventional Rel-15/16 are used as they are, the interval between adjacent DM-RSs in the frequency domain may be greater than the coherence bandwidth, and this may make stable channel estimation difficult. To solve this problem, if DM-RSs are used more densely in the frequency domain, the ratio of DM-RSs to data may increase, so that the channel resource efficiency may decrease.

NR UL supports DFT-s-OFDM, and the number of layers related to data transmission of the UE is limited to 1 (or the channel rank is limited to 1). In a high-frequency broadband environment to be applied in the future, rank 2 or higher may be required for high-capacity data transmission. In this case, PT-RS patterns defined for UL of the legacy system may need to be modified. In addition, a hotspot scenario for covering a small area may be allowed in the high-frequency broadband environment. To this end, an increase in multi-user multiple-input multiple-output (MU-MIMO) capacity in UL may be necessary. In this case, the PT-RS patterns defined for UL of the legacy system may also need to be modified as described above.

Hereinafter, DM-RS enhancement methods will be described to support stable channel estimation in a wireless communication system operating in high-frequency broadbands (e.g., above 52.6 GHz). Specifically, DM-RS enhancement methods for a DL control channel (PDCCH), DL data channel (PDSCH), UL control channel (PUCCH), UL data channel (PUSCH), and broadcast channel (PBCH) will be described. In addition, PT-RS enhancement methods when DFT-s-OFDM is used for the UL data channel will be described.

1.1. DM-RS for PDCCH

In the conventional NR system, the DM-RS pattern of a PDCCH is defined such that DM-RSs are located at the 2nd, 6th, and 10th RE locations (or RE indices 1, 5, and 9) for each REG. In addition, a CORESET may be configured to include up to three OFDM symbols, and PDCCHs included in each OFDM symbol may have the same DM-RS pattern. That is, even if different OFDM symbols are used for PDCCHs, DM-RSs thereof may have the same frequency locations. The DM-RSs of the PDCCH are arranged at intervals of four REs in the frequency domain as described above. Channel information on REs where no DM-RS is located may be estimated by interpolation based on channel information on REs where the DM-RS is located. On the other hand, when the SCS increases (e.g., to 960 kHz) to support NR operation in high frequency bands (e.g., above 52.6 GHz) as described above, the interval between adjacent REs may increase, and the increase may degrade the performance of channel estimation, which is based on DM-RSs arranged at intervals of four REs. Hereinafter, three different methods are proposed as a solution to this problem, and each method may be applied independently or in combination.

Method 1-1) The number of DM-RS REs may remain the same for each REG, but the locations of DM-RS REs may vary for each OFDM symbol included in a CORESET.

Different DM-RS RE locations may be configured for each OFDM symbol included in one CORESET. That is, the number of DM-RS REs (e.g., three DM-RS REs) included in the REG may remain the same, whereas REs in which the DM-RS is located may be independently configured for each of the indices of OFDM symbols included in the CORESET. Alternatively, a relationship may be configured such that the DM-RS RE location k is determined based on the OFDM symbol index (=0, 1, or 2). For example, the DM-RS RE location may be determined by k=func (OFDM index). As a specific embodiment of Method 1-1, for two OFDM symbols included in a CORESET shown in FIG. 4, DM-RSs of the first OFDM symbol may be allocated to RE indices 1, 5, and 9 in an REG as in the legacy system, and DM-RSs of the second OFDM symbol may be allocated to RE indices 3, 7, and 11, unlike the legacy system.

Figure 5:
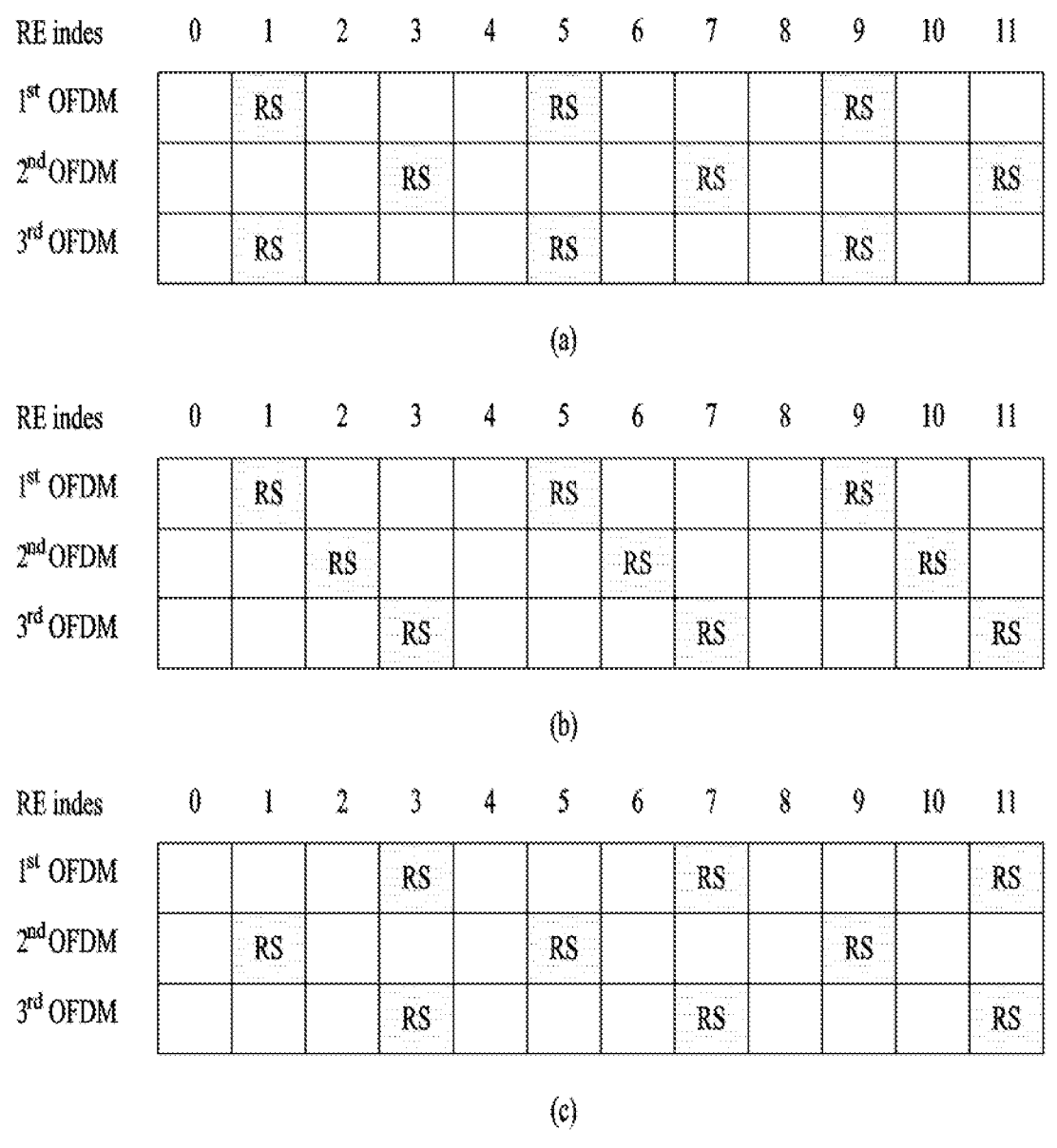

For the DM-RS pattern of FIG. 4, channel estimation on subcarriers corresponding to RE indices 3, 7, and 11 may be performed directly from DM-RSs with intervals of at least two OFDM symbols. On the other hand, for the DM-RS pattern of the legacy system, channel estimation on subcarriers corresponding to RE indices 3, 7, and 11 may use only interpolated channel estimation values for all OFDM symbols. In other words, only indirect channel estimation may be allowed, and the larger the interval between REs, the greater the difference in channel estimation performance. Even when a CORESET is composed of three OFDM symbols, DM-RSs may be allocated according to Method 1-1. FIG. 5 illustrates three embodiments therefor.

In the operations described above based on Method 1-1, the DM-RS RE location for each OFDM symbol may be predefined for a specific frequency band (e.g., above 52.6 GHz) or a specific SCS (e.g., above 120 kHz SCS). Alternatively, the DM-RS RE location for each OFDM symbol may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 1-1 may be defined in a higher layer parameter such as RRC, and the operations of Method 1-1 may be enabled only when a specific condition is satisfied (e.g., when the SCS is 960 kHz).

Method 1-2) The total number of DM-RS REs of PDCCHs in a CORESET may remain the same, but the number of DM-RS REs may vary for each OFDM symbol.

Figure 6:
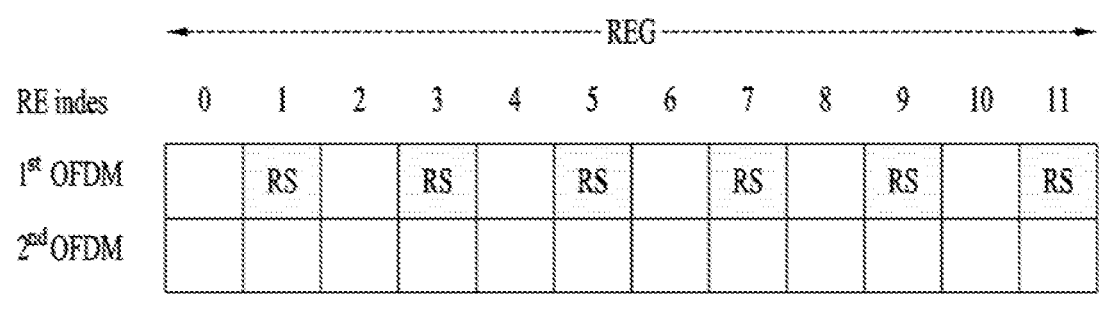

The total number of DM-RS REs allocated to PDCCHs in a CORESET may remain the same, whereas the number of DM-RS REs may be independently configured for each OFDM symbol included in the CORESET. For example, DM-RS REs in REGs included in one OFDM symbol may be numbered from 0 to 9, and thus, stable channel estimation may be performed in an environment where dense DM-RSs are required. As a specific embodiment of the method, for two OFDM symbols included in a CORESET shown in FIG. 6, DM-RSs of the first OFDM symbol may be allocated to RE indices 1, 3, 5, 7, 9, and 11 in an REG, and no DM-RSs may be allocated to the second OFDM symbol.

Even when a CORESET is composed of three OFDM symbols, DM-RSs may be allocated in a similar way, which may follow the embodiment shown in FIG. 7.

In the operations described through method 1-2, the DM-RS RE location for each OFDM symbol may be predefined for a specific frequency band (e.g., above 52.6 GHz) or a specific SCS (e.g., above 120 kHz SCS). Alternatively, the DM-RS RE location for each OFDM symbol may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 1-2 may be defined in a higher layer parameter such as RRC, and the operations of Method 1-2 may be enabled only when a specific condition is satisfied (e.g., when the SCS is 960 kHz).

Method 1-3) The locations of DM-RS REs may be predefined, and then DM-RS patterns may be configured independently depending on configured values.

After predefining the frequency-domain interval and the time-domain interval between DM-RSs, the location of a DM-RS in a PDCCH may be determined according to the configured interval values. As an embodiment of Method 1-3, assuming that the frequency-domain interval between adjacent DM-RS REs is X, the location of the first DM-RS RE in an REG of the first OFDM symbol is Y (for example, Y=1 if the DM-RS RE is located in the first RE), and the DM-RS location difference between the current OFDM symbol and the previous OFDM symbol is Z, the locations of DM-RSs allocated in the CORESET may be determined by independently configuring the values of X, Y, and Z. Specifically, when X=4, Y=2, and Z=2 are configured for a CORESET including three OFDM symbols, the DM-RS pattern may be configured as shown in FIG. 5(*a*). When X=4, Y=4, and Z=2 are configured, the DM-RS pattern may be configured as shown in FIG. 5(*c*). In addition, the network may independently configure the values of X, Y, and Z in consideration of deployment scenarios and channel environments, so that various configurations may be allowed. In Method 1-3, the overhead of the DM-RS may vary depending on the values of X, Y, and Z. The network may increase or decrease the DM-RS overhead depending on the channel state. Alternatively, the network may change only the DM-RS pattern depending on the situation while maintaining the DM-RS overhead. For example, if the frequency selectivity of the channel is more than or equal to a specific level, the network may increase the DM-RS overhead for stable channel estimation even though the data rate decreases. If the channel variation is not large, the network may decrease or maintain the DM-RS overhead depending on the amount of required data. In Method 1-3, the values of X, Y, and Z may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 1-3 may be defined in a higher layer parameter such as RRC, and the operations of Method 1-3 may be enabled only when a specific condition is satisfied (e.g., when the SCS is 960 kHz).

1.2. DM-RS for PUCCH Format 2

According to the DM-RS pattern of PUCCH format 2 of the legacy system, DM-RSs may be located at 2nd, 5th, 9th, and 11th RE locations (or RE indices 1, 4, 8, and 10) for each RB. In addition, PUCCH format 2 may include up to two OFDM symbols. DM-RSs included in each OFDM symbol may have the same DM-RS pattern. On the other hand, when the SCS increases (e.g., to 960 kHz) to support NR operation in high frequency bands (e.g., above 52.6 GHz) as described above, the interval between adjacent REs may increase, and the increase may degrade the performance of channel estimation, which is based on DM-RSs arranged at intervals of three REs. Hereinafter, two different methods are proposed as a solution to this problem, and each method may be applied independently or in combination. The methods of Section 1.2 may be applied when PUCCH format 2 consists of two OFDM symbols. In addition, the methods of Section 1.2 may be applied only when intra-slot frequency hopping is disabled.

Method 2-1) The number of DM-RS REs in the first PUCCH symbol may be set equal to that in the second PUCCH symbol, but different DM-RS locations may be configured for each symbol.

Figure 8:
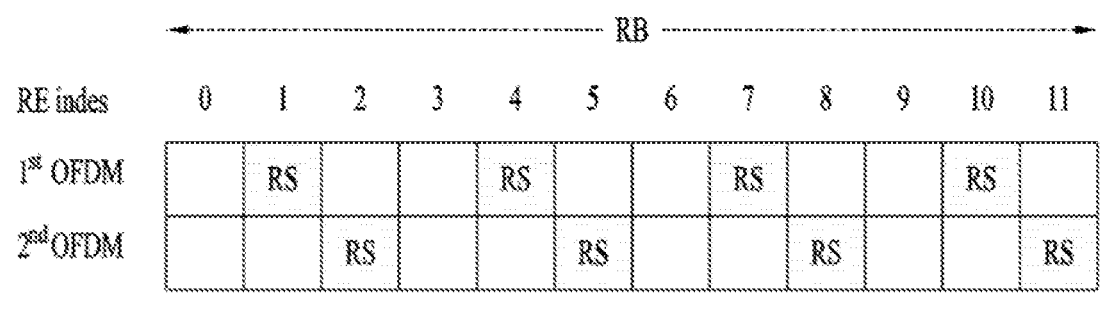

A method of configuring different DM-RS RE locations for the first and second PUCCH symbols may be considered. That is, the number of DM-RS REs (e.g., four DM-RS REs) may remain the same for each RB included in a PUCCH symbol, whereas REs in which the DM-RS is located may be independently configured according to symbol indices. Alternatively, a relationship may be configured such that the DM-RS RE location k is determined based on the PUCCH symbol index (=0 or 1). For example, the DM-RS RE location may be determined by k=func (OFDM index). As a specific embodiment of Method 2-1, for two PUCCH symbols shown in FIG. 8, DM-RSs of the first OFDM symbol may be allocated to RE indices 1, 4, 7, and 10 in an RB as in the legacy system, and DM-RSs of the second OFDM symbol may be allocated to RE indices 2, 5, 8, and 11, unlike the legacy system.

In the operations described above based on Method 2-1, the DM-RS RE location for each symbol may be predefined for a specific frequency band (e.g., above 52.6 GHz) or a specific SCS (e.g., above 120 kHz SCS). Alternatively, the DM-RS RE location for each symbol may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 2-1 may be defined in a higher layer parameter such as RRC, and the operations of Method 2-1 may be enabled only when a specific condition is satisfied (e.g., when the SCS is 960 kHz).

Method 2-2) DM-RSs may be densely allocated only to the first PUCCH symbol, but no DM-RSs may be allocated to the second symbol.

DM-RSs may be allocated to the first symbol of two PUCCH symbols twice as much as those of the legacy system, and UCI may be configured in the second symbol with no DM-RS. As a specific embodiment of Method 2-2, for two PUCCH symbols shown in FIG. 9, DM-RSs of the first symbol may be allocated to even-numbered REs in an RB (or may be allocated to odd-numbered REs), and the second symbol may be set to a UCI-only symbol.

In the operations described above based on Method 2-2, the DM-RS RE location for each symbol may be predefined for a specific frequency band (e.g., above 52.6 GHz) or a specific SCS (e.g., above 120 kHz SCS). Alternatively, the DM-RS RE location for each symbol may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 2-2 may be defined in a higher layer parameter such as RRC, and the operations of Method 2-2 may be enabled only when a specific condition is satisfied (e.g., when the SCS is 960 kHz).

Additionally, to increase channel estimation performance, the DM-RS may be allocated while increasing the DM-RS overhead in the PUCCH symbol as in Method 1-3 described above.

1.3. DM-RS for PBCH

According to the DM-RS pattern for a PBCH defined in the legacy system, for the second, third, and fourth symbols of an SSB, DM-RSs are located at intervals of four REs only in a part allocated as the PBCH. When the SCS increases (e.g., to 960 kHz) to support NR operation in high frequency bands (e.g., above 52.6 GHz) as described above, the interval between adjacent REs may increase, and the increase may degrade the performance of channel estimation, which is based on DM-RSs arranged at intervals of four REs. Hereinafter, a method of changing the locations of DM-RS REs of the third or fourth symbol of the SSB will be described as a solution to this problem.

Method 3-1) DM-RS RE locations may vary depending on SSB symbol indices.

In the legacy system, the SSB consists of four OFDM symbols. Specifically, only the PBCH may be located at the second and fourth symbols, but the PBCH may be located at the rest of the third symbol except for an SSS and a guard period. In a part of each symbol where the PBCH is allocated, DM-RSs may be allocated in units of four REs. For the same cell, the allocated DM-RSs may have the same RE locations. (However, for different physical cell ID, the same size offset is applied to determine the locations of the DM-RS REs. In addition, for the third symbol of the SSB, the DM-RS may be allocated only to the part to which the PBCH is allocated.) In Method 3-1, it is proposed to configure different DM-RS RE locations for the PBCH for each SSB symbol index. Specifically, for the second SSB symbol, the DM-RS pattern defined in the legacy system may be used as it is, and for the third and/or fourth SSB symbol, DM-RSs may be allocated at DM-RS RE locations different from those of the previous symbol. In an embodiment of the proposed method, the DM-RS RE location (index) of the third SSB symbol may increase by +1 compared to that of the second symbol, and the DM-RS RE location (index) of the fourth SSB symbol may increase by +1 compared to that of the third symbol. According to Method 3-1, if the time-domain channel variation between the second symbol and the fourth symbol is not large, the DM-RS RE locations may be regarded to be at intervals of two REs, and thus, improvement of channel estimation performance may be expected. In another embodiment, the DM-RS RE locations of the second and fourth (or third) symbols may remain the same, whereas only the DM-RS RE locations of the third (or fourth) symbol may be shifted by +2 compared to the DM-RS RE locations of other symbols.

In the operations described above based on Method 3-1, the DM-RS RE location for each symbol may be predefined for a specific frequency band (e.g., above 52.6 GHz) or a specific SCS (e.g., above 120 kHz SCS). Alternatively, the DM-RS RE location for each symbol may be configured semi-statically by higher layer signaling such as RRC. Alternatively, several available patterns may be predefined, and a specific pattern among the predefined patterns may be configured by dynamic signaling. In addition, a field of enabling/disabling whether to apply the operations of Method 3-1 may be defined in a higher layer parameter such as RRC, and the operations of Method 3-1 may be enabled only when a specific condition is satisfied (e.g., when the SCS is 960 kHz).

1.4. DM-RS Enhancement for PDSCH/PUSCH (CP-OFDM)

In the legacy system, the DM-RS pattern for a DL PDSCH is configured by higher layer signaling. In addition, the DM-RS pattern may be configured independently for each PDSCH, depending on mapping type A/B and each BWP. For a UL PUSCH, DM-RSs may be configured in the same/similar way as those of a PDSCH if CP-OFDM is used. DM-RSs may be allocated for scheduled PDSCH/PUSCH resources. In the frequency domain, the number of DM-RS used for each symbol and/or RB may vary depending on two types. Specifically, the number of supportable CDM groups and multiplexed DM-RS ports for each CDM group may vary depending on DM-RS type 1/2. In a CDM group, multiple DM-RS ports may be multiplexed by applying a time-domain OCC (TD-OCC) or a frequency-domain OCC (FD-OCC). The FD-OCC may be applied to one OFDM symbol. However, if REs to which the FD-OCC is applied have small channel variation, orthogonality may be maintained between OCC sequences, and DM-RS multiplexing based on the FD-OCC may be effectively applied. In other words, decoupling between DM-RS ports to which the FD-OCC is applied may be sufficiently secured. Therefore, for DM-RS type 1, DM-RS ports may be effectively multiplexed only when there are no significant fluctuations in frequency channels in the range of three REs. For DM-RS type 2, DM-RS ports may be stably multiplexed only when there are no significant fluctuations in frequency channels in the range of two REs. As described above, it is expected that a large SCS will be introduced in NR operating in high frequency bands (e.g., above 52.6 GHz) and wide bands (e.g., 2 GHz bandwidth), compared to the legacy system. For stable channel estimation, more DM-RSs may be required for each RB. Accordingly, when the DM-RS pattern defined in the legacy system is used, if the channel variation increases within the frequency range to which the FD-OCC is applied (for example, three REs in DM-RS type1), there is a possibility that the FD-OCC may no longer operate reliably, which may cause performance degradation. Hereinafter, methods of changing the operations of the UE when the FD-OCC is not guaranteed as described above.

Method 4-1) The operations of the UE may change so that DM-RS resources for a plurality of DM-RS ports are available for a single DM-RS port, or the operations of the UE may change by reinterpreting the relationship between DM-RS ports and DM-RS resources.

In NR operation of the legacy system, the network may transmit the number of CDM groups without data and DM-RS port indices to the UE though the 'Antenna Port Indication' field defined in DCI. Based on the information transmitted through the 'Antenna Port Indication' field, the UE may obtain information on the number of DM-RS resources where a scheduled PDSCH (or PUSCH) is not allocated and information on the CDM groups. The UE may know DM-RS port indices used for the scheduled PDSCH (or PUSCH). At the same time, the UE may implicitly obtain the following information: the rank of a corresponding link, the presence of DM-RS power boosting, and the presence of single-user multiple-input multiple-output (SU-MIMO). For example, if one CDM group and DM-RS ports of {0, 1} are indicated for a one-symbol DM-RS, the UE may operate by assuming that DM-RS ports 0 and 1 are configured to be multiplexed according to the FD-OCC. However, as described above, if the above configuration is indicated in a situation where the FD-OCC is not guaranteed, orthogonality between ports may not be secured based on the FD-OCC. As a result, port decoupling may not be sufficiently performed, which may degrade reception performance in both ports 0 and 1. In addition, a channel where the FD-OCC is not guaranteed may refer to a channel where channel variation between adjacent DM-RS REs (three REs for type1 and two REs for type2) is more than or equal to a certain level (specifically, it means a case where the interval between adjacent DM-RS REs is more than the coherence bandwidth of the channel). As a result, the receiver may not perform channel estimation correctly. In Method 4-1, it is proposed that UE may operate in different ways, instead of using DM-RS ports indicated by DCI in a channel environment where the FD-OCC is not guaranteed. In an embodiment of Method 4-1, when the UE determines that port decoupling is not allowed even though a plurality of DM-RS port indices are indicated by DCI, the UE may operate by determining DM-RS resources allocated for the plurality of ports as DM-RS resources for a single port. Specifically, even if one CDM group and ports 0 and 1 are indicated by DCI, the UE may operate differently by determining that only a single port is used. When the UE determines that ports indicated by DCI are not decoupled, the UE may make a decision based on predefined configuration values or an indication received from the network. Additionally, when the UE performs single-port operation, the UE may perform channel estimation by selecting only some DM-RS resources to prevent performance degradation due to non-orthogonal FD-OCC sequences. Alternatively, all DM-RS resources may be used for channel estimation and single-layer data transmission and reception for a single port. In another embodiment, even if ports 0 and 1, which are OCC multiplexed, are indicated by DCI, the network or UE may determine that decoupling is not allowed between ports 0 and 1 and then operate as if ports 0 and 2 are indicated. In Method 4-1, ports 0 and 1 may be DM-RS ports multiplexed by the FD-OCC, and ports 0 and 2 may be DM-RS ports multiplexed with different REs. Additionally, if it is difficult for the UE to use a specific port indicated by DCI, the UE may operate by switching and/or swapping to another port, similarly to when the UE operates as if port 2 is indicated rather than port 1. In another embodiment, when two CDM groups and two port pairs of {port 0, port 1} and {port 2, port 3}, which are multiplexed by the FD-OCC, are indicated by DCI, the UE may assume that only ports 0 and 2 are indicated if the UE is not allowed to apply the FD-OCC.

In Method 4-1, a condition for the UE to change operations indicated by the network to other operations may be predefined for a specific frequency band (e.g., above 52.6 GHz) or a specific SCS (e.g., above 120 kHz SCS). The condition for the UE to change operations indicated by the network to other operations may be semi-statically configured by higher layer signaling such as RRC. Whether a specific condition for the UE to change operations indicated by the network to other operations is satisfied may be determined by the network or UE. For example, if the SCS is set above a specific value (e.g., 960 kHz) or if the channel bandwidth is set to 2 GHz, it may be determined that the specific condition is satisfied. Whether the specific condition is satisfied may be dynamically signaled by the network. In addition, a field of enabling/disabling a method for the UE to change operations indicated by the network to other operations may be defined in a higher layer parameter such as RRC, and the method for the UE to change operations indicated by the network to other operations may be enabled only when a specific condition is satisfied (e.g., when the SCS is 960 kHz).

Additionally, Method 4-1 has no limitations depending on the configuration of a single-symbol DM-RS or double-symbol DM-RS, no limitations depending on DM-RS type 1 or DM-RS type 2, no limitations depending on mapping type-A or type-B, and/or no limitations depending on the number of additional DM-RS symbols, which means that the UE may operate in a different way from as indicated for all available DM-RS configurations.

Method 4-1 has been described based on DL operations, but this does not mean that the proposed method is limited to DL only. The DM-RS configurations and/or operations according to Method 4-1 may be equally applicable to configurations and/or operations for a UL PUSCH.

Method 4-1 may be summarized as follows.

For a DMRS configuration including the number of CDM groups and/or DMRS port indices for a DMRS, the BS and/or UE may operate as follows based on the above-described details according to semi-static indications based on higher layer signaling such as RRC/MAC-CE (control element) and/or dynamic indications such as DCI.

4-1-1) After configuring a plurality of DMRS ports (or even if a plurality of DMRS resources are allocated/configured), only some DMRS ports may be considered valid.

The plurality of configured DMRS resources may be used as resources for one DMRS port (or DMRS ports less than a configured number of DMRS ports).

Only some of the plurality of configured DMRS resources may be used to configure one DMRS port (or DMRS ports less than a configured number of DMRS ports).

After a plurality of DMRS ports (or DMRS resources) included in a plurality of CDM groups are configured (and/or indicated), the configuration may be used for one DMRS port (or DMRS ports less than a configured number of DMRS ports) per CDM group.

4-1-2) After configuring a plurality of DMRS ports, DMRS port indices different from the configured port indices may be used.

For example, DMRSs may be configured for two ports belonging to the same CDM group, and then the configuration may be changed or interpreted as that for two ports that do not belong to the same CDM group (for example, two frequency division multiplexed (FDMed) ports). For example, ports 0 and 1 in the same CDM group may be configured, but the configuration may be modified or interpreted as a configuration for ports 0 and 2.

4-1-3) After a DMRS configuration is indicated for a single DMRS port, the configuration may be changed or interpreted as that for a DMRS port with an index different from the indicated index. In this case, the two DMRS ports may be in the same CDM group or belong to different CDM groups.

4-1-4) One DMRS CDM group may include a plurality of DMRS ports. For example, for a single-symbol DMRS, two ports per CDM group may be code division multiplexed (CDMed) based on the frequency OCC. For a double-symbol DMRS, four ports per CDM group may be CDMed based on the time and frequency OCCs. When one, some, or all of the DMRS ports belonging to a CDM group are configured for a specific UE, the remaining DMRS ports belonging to the same CDM group may be assigned to other UEs. For NR operation above 52.6 GHz, if the interval between adjacent REs is larger than the coherence bandwidth due to a newly introduced SCS (e.g., 960 kHz), FD-OCC OFF may be configured. In this case, even if some DMRS ports in a CDM group are allocated to a specific UE, other DMRS ports in the same CDM group may be configured not to be allocated to other UEs except for the specific UE. For example, when FD-OCC OFF and/or TD-OCC OFF is configured according to configuration methods including Method 4-2 described later, if one port for a single-symbol DMRS is allocated/indicated to a specific UE, the remaining one DMRS port belonging to the same CDM group may not be allocated/indicated to other UEs. Alternatively, if one, two, three DMRS ports for a double-symbol DMRS are allocated/indicated to a specific UE, the remaining DMRS ports belonging to the same CDM group may not be allocated/indicated to other UEs. In this document, the allocation/indication may mean that the BS (e.g., gNB) allocates/indicates a specific DMRS port to a specific UE. From the perspective of the UE, the allocation/indication may mean that the UE expects that the BS will allocate/indicate a specific DMRS port to a specific UE and will not allocate/indicate the remaining DMRS ports to other UEs.

Method 4-2) Different FD-OCC ON/OFF operations, different DMRS port configurations, and/or different DMRS port resources may be configured or indicated (i.e., port switching/swapping) between DMRS ports.

In this document, FD-OCC may refer to a method of multiplexing a plurality of DMRS ports in a CDM group based on an OCC in the frequency domain, which is supported by the NR system. FD-OCC OFF may be interpreted to mean disabling the FD-OCC or imposing limitations on the type of OCC applied to a CDM group to which the FD-OCC is applied. Port switching and/or FD-OCC disabling of Method 4-1 may be triggered based on the details (or conditions) described in Method 4-2. The operations of Method 4-1 may be configured based on the details/conditions described in Method 4-2 (or the operations described in Method 4-2).

4-2-1) FD-OCC OFF and/or DMRS port switching/swapping may be configured semi-statically by higher layer signaling such as RRC or MAC-CE.

For predefined specific situations (determined based on one of DL/UL configurations values such as a frequency band, SCS, and modulation and coding scheme (MCS) or any combination thereof), the network may semi-statically indicate FD-OCC OFF and/or DMRS port switching/swapping.

4-2-2) FD-OCC OFF and/or DMRS port switching/swapping may be explicitly configured by control signals/channels such as DCI.

The BS may transmit an explicit configuration/indication to the UE through a bit field for triggering FD-OCC OFF and/or DMRS port switching/swapping.

4-2-3) FD-OCC OFF and/or DMRS port switching/swapping may be explicitly or implicitly configured by tying the FD-OCC OFF and/or DMRS port switching/swapping with a configured PDSCH/PUSCH mapping type and/or a configured DMRS type (type-1/2, the use of an additional DMRS, and/or the presence of a single-symbol/double-symbol DMRS).

Embodiment 1: When a specific SCS (e.g., 960 kHz) and a specific MCS (e.g., 64QAM) are configured in a specific frequency band (e.g., 60 GHz), the BS/UE may assume FD-OCC OFF if DMRS Type-1 is configured. In addition, the BS/UE may assume FD-OCC ON if DMRS Type-2 is configured. Alternatively, FD-OCC ON/OFF may be explicitly indicated.

Embodiment 2: When a specific SCS (e.g., 960 kHz) and a specific MCS (e.g., 64QAM) are configured in a specific frequency band (e.g., 60 GHz), if the use of an additional DMRS is configured or a double-symbol DMRS is configured, and if the TD-OCC is disabled, the BS/UE may assume that FD-OCC is disabled. Alternatively, FD-OCC ON/OFF and/or DMRS port switching/swapping may be explicitly indicated.

Embodiment 3: When a specific SCS (e.g., 960 kHz) and a specific MCS (e.g., 64QAM) are configured in a specific frequency band (e.g., 60 GHz), if a DMRS pattern supported in the legacy system is configured, the BS/UE may assume FD-OCC OFF. If a new DMRS pattern is configured, the BS/UE may operate by assuming FD-OCC ON. Alternatively, FD-OCC ON/OFF and/or DMRS port switching/swapping may be explicitly indicated.

4-2-4) FD-OCC ON/OFF and/or DMRS port switching/swapping ON/OFF may be configured (implicitly/explicitly) in conjunction with a configured PTRS pattern and/or the use of an inter-carrier interference (ICI) compensation scheme.

Embodiment: When a specific SCS (e.g., 960 kHz) and a specific MCS (e.g., 64QAM) are configured in a specific frequency band (e.g., 60 GHz), the use of a specific PTRS pattern and/or an ICI compensation scheme may be implicitly or explicitly configured and/or indicated. If the use of the specific PTRS pattern and/or ICI compensation scheme is configured, the BS and UE may operate by assuming FD-OCC ON/OFF and/or DMRS port switching/swapping.

4-2-5) FD-OCC ON/OFF and/or DMRS port switching/swapping ON/OFF may be configured (implicitly/explicitly) in conjunction with SU-MIMO.

A case in which SU-MIMO operation is explicitly configured (or when multi-user paring is not guaranteed) or a case in which the UE operates by implicitly assuming the SU-MIMO operation according to the configuration of the BS may be included. For example, when the UE is provided with the number of DMRS CDM groups (that is, the number of DMRS CDM group(s) without data, which is denoted by N for convenience) in DCI, the UE may implicitly assume the SU-MIMO for a specific DMRS configuration. When the UE assumes the SU-MIMO, the UE may not need to use some DMRS resources for MU pairing, and thus port switching/swapping may be configured flexibly. For example, if the UE is configured with DMRS ports 0 and 1 and N=1, the UE may operate by assuming the SU-MIMO. The UE may transmit DMRS ports 0 and 1 in a CDM group corresponding to N=1 and transmit data on other REs. The BS and/or UE may interpret port 1 as port 2 by applying the port switching/swapping (i.e., by switching from CDM of ports 0 and 1 to FDM of ports 0 and 2) and then change the operation such that no data is transmitted in a corresponding DMRS symbol.

In the same way, when N=2 is configured, if DMRS ports 0 and 2, which are in the FDM relationship, are indicated, the BS and/or UE may operate by implicitly recognizing FD-OCC OFF.

4-2-6) FD-OCC ON/OFF and/or DMRS port switching/swapping ON/OFF may be configured (implicitly/explicitly) in conjunction with a configured SCS and/or MCS.

Embodiment: When a specific MCS (e.g., 64QAM) is used for a specific SCS (e.g., 960 kHz), the BS and UE may operate by assuming FD-OCC ON/OFF and/or DMRS port switching/swapping.

FD-OCC ON/OFF and/or DMRS port switching/swapping may be configured according to the conditions and methods described in Method 4-2. The BS and UE may implicitly assume that the conditions for performing the operations of Method 4-1 are satisfied according to one or more embodiments of Method 4-2. An indication triggering the execution of the operations of Method 4-1 may be received.

If one or more of the operations of Methods 4-1 and 4-2 are configured, the BS and UE may implicitly assume SU-MIMO (or assume a situation in which MU paring is not performed for resource allocated to a corresponding PDSCH/PUSCH).

Method 4-3) Configuring DMRS port(s) and the number of DMRS CDM groups may be restricted by an antenna port field (in DCI).

DCI formats1_1 or 1_2 (hereinafter referred to as a DL grant) and DCI format 0_1 or 0_2 (hereinafter referred to as a UL grant) may include an antenna port field. The BS may configure and/or indicate to the UE 'the number of DMRS CDM groups without data' and 'DMRS port(s)' through an antenna port field value and a DMRS port allocation table (hereinafter referred to as a DMRS table). DMRS tables for DL grants are defined in 3GPP TS 38.212 as follows: Table 7.3.1.2.2-1 to Table 7.3.1.2.2-4 and Table 7.3.1.2.2-1A to Table 7.3.1.2.2-4A. DMRS tables for UL grants are defined in 3GPP TS 38.212 as follows: Table 7.3.1.1.2-6 to Table 7.3.1.1.2-23 and Table 7.3.1.1.2-6A to Table 7.3.1.1.2-7A. On the other hand, when a PTRS is configured, there may be a limitation on the number of DMRS ports configurable at the same time. Specifically, DMRS ports CDMed based on the TD-OCC within one CDM group may be limited. For DL, DMRS ports 1004 to 1007 for DMRS type 1 and/or DMRS ports 1006 to 1011 for DMRS type 2 may be limited. For UL, DMRS ports 4 to 7 or DMRS ports 6 to 11 for DMRS type 1 or type 2 may be limited. For 60 GHz band operation, since the effect of phase noise increases due to the nature of the frequency band, the PTRS may need to be configured, and thus, some DMRS tables of the legacy system may not be used. In addition, the beamwidth of a transmission beam in the 60 GHz band may be narrower than that in bands below 52.6 GHz. Since the necessity may be lowered except for MU-MIMO based on spatial domain multiplexing, the transmission rank (the number of layers) may be limited to a low (e.g., rank1 or rank2). As a result, the probability of configuring a DMRS port for a high rank may be lowered due to the limitation on the transmission rank.

Meanwhile, due to the SCS of 480/960 kHz introduced for operation in NR bands above 52.6 GHz, the interval between adjacent REs (or subcarriers) may be larger than the coherence bandwidth. As a result, the use of CDM based on the FD-OCC within one DMRS CDM group may degrade channel estimation performance. For example, for DMRS type 1, DMRS ports 0 and 1 may use the same RE and be CDMed. When 0 is indicated by the DCI antenna port field and when DMRS port(s) are indicated by Table 7.3.1.2.2-1 described above, the UE may experience channel estimation performance degradation upon receiving the indication. Due to the above problem, the CDM based on the frequency OCC may not be used. To avoid the use of the CDM based on the frequency OCC, it may be indicated by the table indicating the DMRS port(s) that the frequency OCC is not used.

Hereinafter, a method of indicating additional configurations required in bands above 52.6 GHz by modifying a DMRS table (without increasing the size of the antenna port field in DCI), instead of indicating a DMRS port that is not configured with a PTRS in NR operation above 52.6 GHz will be described.

First, indicating DMRS port(s) additionally required in NR bands above 52.6 GHz will be described. As described above, when a high SCS (e.g., 960 kHz) is configured and when the coherence bandwidth is smaller than the interval between adjacent REs, if the CDM based on the frequency OCC is configured within one CDM group, channel estimation performance may be degraded. Therefore, each UE may need to be configured to use only one DMRS port for one CDM group. At the same time, other DMRS ports within the corresponding CDM group may need to be configured not to be allocated to other UEs. That is, a method of informing a specific UE of 'single DMRS port+no multiplexing with other orthogonal ports' based on the DCI antenna port field and the DMRS table is required. Additionally, the DCI antenna port field and the DMRS table may be used to instruct the specific UE to use one DMRS port for each CDM group orthogonal by the FDM scheme (without multiplexing with other orthogonal ports). In the legacy system, the DMRS port indication (i.e., implicit indication of the SU-MIMO situation) may be enabled by the DMRS table, but this cases is significantly limited. For example, in Table 7.3.1.2.2-1, if values of 2, 9, 10, and 11 are indicated by antenna ports, the UE may recognize the SU-MIMO situation. Among these values, only the value 11 corresponding to rank 2 transmission may instruct to use only one DMRS port per CDM group. Therefore, an indicator that instructs to use one DMRS port per CDM group and not to use other DMRS ports within the CDM group needs to be added for rank 1 transmission. As another example, the UE may be instructed to use DMRS ports 0, 2, 4, and 6 through index 30 of Table 7.3.1.2.2-2. In this case, ports 0 and 4 of CDM group 0 or ports 2 and 6 of CDM group 1 may be CDMed by the time OCC. For CDM groups 0 and 1, which are not indicated by Table 7.3.1.2.2-2, a method of instructing to use ports 0, 1, 2, and 3 CDMed by the frequency OCC may be added. For additional indications through the DMRS table, reserved indices of the DMRS table preconfigured in the system may be used. For example, when type=1 and maxLength=1 are configured for the DMRS of a PDSCH scheduled by DCI format 1_1, DMRS ports may be indicated by the corresponding DCI antenna port field value and Table 7.3.1.2.2-1. Field values of 3, 4, 5, and 6 may indicate DMRS ports 0, 1, 2, and 3, respectively. Upon receiving the above indication, the UE may recognize that other DMRS ports in a CDM group to which an indicated DMRS port belongs may be allocated to other UEs. When performing DMRS-based channel estimation, the UE needs to attempt to perform demultiplexing of CDM (e.g., orthogonal code dispreading). In a situation where channel estimation performance degradation is expected due to CDM, if the UE is indicated with a single DMRS port, and if the UE is explicitly indicated that other ports in a CDM group to which the indicated single port belongs are not used, the performance degradation due to the CDM may not occur. To this end, the UE may be provided with DMRS ports with no CDM by reserved antenna port values of 12 to 15 in Table 7.3.1.2.2-1 as follows.

TABLE 8

| | One Codeword: Codeword 0 enabled, Codeword 1 disabled | |
| --- | --- | --- |
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

Table 8 is Table 7.3.1.2.2-1 defined in the legacy system, and the antenna port value corresponds to 1000+DMRS port. Table 8 is used when dmrs-Type=1 and maxLength=1. According to Method 4-3, Table 8 may be modified as shown in Table 9.

TABLE 9

| | One Codeword: Codeword 0 enabled, Codeword 1 disabled | | |
| --- | --- | --- | --- |
| Value | Number of DMRS CDM group(s) without data | DMRS port(s) | Interpretation |
| 0 | 1 | 0 | |
| 1 | 1 | 1 | |
| 2 | 1 | 0, 1 | |
| 3 | 2 | 0 | CDM is applied. |

TABLE 9-continued

| | One Codeword: Codeword 0 enabled, Codeword 1 disabled | | |
|---|---|---|---|
| Value | Number of DMRS CDM group(s) without data | DMRS port(s) | Interpretation |
| 4 | 2 | 1 | That is, other orthogonal DMRS ports within |
| 5 | 2 | 2 | CDM group may be allocated to other UEs. |
| 6 | 2 | 3 | |
| 7 | 2 | 0, 1 | |
| 8 | 2 | 2, 3 | |
| 9 | 2 | 0-2 | |
| 10 | 2 | 0-3 | |
| 11 | 2 | 0, 2 | |
| 12 | 2 | 0 | CDM is not applied. |
| 13 | 2 | 1 | That is, other orthogonal DMRS ports within |
| 14 | 2 | 2 | CDM group are not allocated to other UEs. |
| 15 | 2 | 3 | |

Additional indications through the DMRS table may be defined to be used, instead of 'indices unused in a specific band/situation' described later. In this regard, an indication of unused DMRS ports will be described. This indication may be detected according to Methods 4-3-1, 4-3-2, 4-3-3, and 4-3-4, which will be described below.

4-3-1) For each DMRS port indication corresponding to an antenna port value (hereinafter referred to as a p-value) of the DMRS table, it is assumed that set P1 denotes a set of p-values indicating DMRS ports incapable of being configured simultaneously with the PTRS. For example, in Table 7.3.1.2.2-2/2A, for one codeword, p-value=16 to 19 and 22 to 30 correspond to set P1, and for two codewords, 0 to 3 correspond to set P1. For all DMRS tables related to DL and UL grants, p-values indicating DMRS ports incapable of being configured simultaneously with the PTRS may be defined as set P1.

4-3-2) For each of DL and UL, if the transmission rank is limited to a low rank (e.g., rank1 or rank2), there may be unused DMRS ports. A set of p-values indicating these DMRS ports may be defined as set P2. For example, if the transmission rank is limited to rank 2 in a specific band, p-value={9, 10} in Table 7.3.1.2.2-1 may correspond to set P2. For all DMRS tables related to the DL and UL grants, p-values that are not used in low ranks may be defined as set P2.

4-3-3) If CDM based on the frequency OCC is not used within one CDM group, a set of invalid p-values may be defined as set P3. For example, p-value=2, 7, 8, 9, and 10 in Table 7.3.1.2.2-1 may correspond to set P3. For all DMRS tables related to the DL and UL grants, if the CDM based on the frequency OCC is not used, invalid p-values may be defined as set P3.

4-3-4) Set P suitable for a specific DMRS configuration may be defined by the union or intersection of all or part of sets P1, P2, and P3 defined above. For example, when DMRS Type 1 and maxLength=2 are configured for DL and when the antenna port is transmitted in DCI format 1_1, Set P is defined based on Table 7.3.1.2.2-2. In this case, if the PTRS is configured, set P1 may include p-value={16 to 19, 22 to 30} for a single codeword. If there is a restriction on rank 2, set P2 may include p-value={5, 6, 8, 9, 10}. If the use of CDM based on the frequency OCC is not allowed, set P3 may include p-value={2, 7, 8, 9, 10, . . . }. In this case, the unused p-values may be expressed as set P corresponding to the union of sets P1, P2, and P3.

Methods 4-3-1, 4-3-2, 4-3-3, and 4-3-4 for determining set P may be used for antenna ports transmitted in each DCI format of a DL and/or UL grant and DMRS tables related thereto. Accordingly, unused p-values among predefined DMRS tables may be used if a specific DL/UL transmission situation, a DMRS configuration, and the number of codewords are configured.

As a specific embodiment for indicating additional configurations based on unused p-values in the DMRS table, for a PDSCH configuration scheduled in DCI format 1_1, DMRS type 1 and maxLength=2 may be configured. In addition to that, the PTR may be configured to be used. In this case, Table 7.3.1.2.2-2 may be used as the DMRS table. Since DMRS ports 1004 to 1007 are not used due to the use of the PTRS, set P1={16, . . . , 19, 22, . . . , 30} for one codeword, and set P1={0, . . . , 3} for two codewords. In other words, in Table 10, values 16 to 19 and 22 to 30 corresponding to one codeword and/or values 0 to 3 corresponding to two codewords may be included in P1.

TABLE 10

| One Codeword: Codeword 0 enabled, Codeword 1 disabled | | | | Two Codewords: Codeword 0 enabled, Codeword 1 enabled | | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |

TABLE 10-continued

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

Since the indices of set P1 are not used, it may be instructed to use only one DMRS port within a CDM group and not to use the remaining DMRS ports belonging to the same CDM group. For example, if the indices belonging to P1 of the DMRS table are modified as shown in Table 11, DMRS ports 0 and 1 may be indicated by p_values 16 and 17, and at the same time, it may be explicitly indicated that the remaining ports in the CDM group are not used.

TABLE 11

| | One Codeword: Codeword 0 enabled, Codeword 1 disabled | | | |
|---|---|---|---|---|
| Value | Number of DMRS CDM group(s) without data | DMRS port(s) | Number of front-load symbols | |
| 0 | 1 | 0 | 1 | CDM within CDM group is allowed |
| 1 | 1 | 1 | 1 | CDM within CDM group is allowed |
| | Skipped | | | |
| 16 | 1 | 0 | 1 | CDM within CDM group is not allowed |
| 17 | 1 | 1 | 1 | CDM within CDM group is not allowed |
| | Skipped | | | |

In addition, the DMRS table may also be modified (or reinterpreted) as follows.

4-3-5) When FD-OCC OFF is configured, operations based on the DMRS table may be configured as follows.

If DMRS FD-OCC OFF is configured according to one of the semi-static or dynamic methods including the operations of Method 4-2, FD-OCC ON may be assumed for some p_values of the DMRS table, and FD-OCC OFF may be assumed for the other p_values. For example, when FD-OCC OFF is configured, FD-OCC ON may be applied to p_values of the DMRS tables where the number of CDM groups is 1, and FD-OCC OFF may be applied to p_values where the number of CDM groups is 2.

Additionally, whether FD-OCC ON or OFF is applied to the DMRS may be configured through higher layer signaling such as RRC for each DMRS CDM group, each DMRS port, or each p_value of DMRS tables, rather than for each DMRS table, which may be summarized as follows.

FD-OCC ON/OFF may be configured for each DMRS port.

FD-OCC ON/OFF may be configured for each DMRS CDM group.

FD-OCC ON/OFF may be configured for each index of the DMRS table.

In this case, FD-OCC ON/OFF for each p_value (each index of the DMRS table), FD-OCC ON/OFF for each DMRS port, and/or FD-OCC ON/OFF for each CDM group may be predefined or configured through higher layer signaling such as RRC/MAC-CE. In addition, some or all of the above methods may be configured/applied together in combination.

1.5. PT-RS Enhancement for PUSCH (DFT-s-OFDM)

For UL operations, the legacy system may support the CP-OFDM mode and the DFT-s-OFDM mode. The DFT-s-OFDM mode may support limited MU-MIMO capacity, compared to the CP-OFDM mode. The DFT-s-OFDM mode may support only rank 1 transmission for each UE. On the other hand, frequency bands above 52.6 GHz may be used in the future. The high-frequency NR system may be expected to provide broadband services in small coverage due to the frequency band characteristics. For example, significantly large user capacity and user density (e.g., hotspot) may be required. For the 60 GHz band operation, unlicensed bands may be included, which may be shared with non-3GPP RATs represented by IEEE 802.11ad/ay (WiGig). In particular, since the WiGig system operates based on channelization in units of 2.16 GHz, NR operating in the corresponding frequency bands may also support a similar bandwidth in consideration of smooth coexistence with WiGig in the corresponding frequency bands. In addition, since an SCS larger than SCSs configurable in FR1/FR2 may be introduced for NR operating in the high frequency band (e.g., 60 GHz), the bandwidth of NR operation in the above band may be set to about 2 GHz. In the UL DFT-s-OFDM mode of NR, a PT-RS sequence may be inserted in units of samples for each DFT-s-OFDM symbol before DFT precoding. The same number of samples may be defined as one group, and the number of groups per DFT-s-OFDM symbol and the number of samples in a group may be configured. The number of groups per symbol and the number of samples per group may be determined according to a scheduled bandwidth. In legacy systems, the number of groups may be set to 2, 4 or 8. In addition, the number of samples per group may be set to 2 or 4. In this case, the number of samples per group may mean the MU-MIMO capacity of the UL DFT-s-OFDM mode. Each sample may be multiplexed with a length-2 or length-4 OCC. According to the above description, when the MU-MIMO capacity of the NR UL DFT-s-OFDM mode increases, the number of PT-RS samples per group may need to increase. In addition, the increase in the number of PT-RS samples per group may require introduction of a longer OCC. Hereinafter, PT-RS patterns for supporting an increase in the MU-MIMO capacity of UL DFT-s-OFDM mode will be described. Additional introduction of an OCC for supporting rank 2 will also be described.

Method 5-1) A PT-RS pattern may be added to support an increase in the MU-MIMO capacity.

To support the PT-RS when the MU-MIMO capacity increases, a method of decreasing the number of groups per DFT-s-OFDM symbol and increasing the number of samples per group at the same rate may be introduced. In addition, for a significantly large channel bandwidth, the rate of decrease in the number of groups per symbol may be set lower than the rate of increase in the number of samples per group, so that the ratio of PT-RS samples included in one DFT-s-OFDM symbol may increase constantly.

For the UL DFT-s-OFDM mode of the legacy system, the maximum number of configurable PT-RS groups is 8, and the maximum number of configurable PT-RS samples per group is 4. Since the MU-MIMO capacity may be limited to the number of PT-RS samples per group, the number of PT-RS samples per group may need to increase to 4 or more in order to support an increase in the capacity. Meanwhile, the total number of PT-RS samples included in one DFT-s-OFDM symbol may be determined by multiplying 'the number of groups per symbol' and 'the number of samples per group', which are configured. When the number of groups is 2, the number of samples may be determined as 4 and 8. When the number of groups is 4, the number of samples may be determined as 8 and 16. When the number of groups is 8, the number of samples may be determined as 32. In this case, since the number of groups and the number of samples are determined according to the allocated bandwidth, a PT-RS sample rate suitable for each bandwidth may be maintained for each PT-RS pattern. In addition, as the scheduled bandwidth increases, the ratio of PT-RS samples included in one DFT-s-OFDM symbol may increase constantly. Thus, when the number of PT-RS samples per group increases to increase the MU-MIMO capacity, the number of groups may need to decrease at the same rate in order to maintain PT-RS overhead. For a large bandwidth, the number of PT-RS groups and the number of samples per group may be configured such that the PT-RS overhead increases constantly.

In Method 5-1, the number of groups per symbol and the number of samples per group may be semi-statically configured by higher layer signaling such as RRC. Alternatively, after predefining several configurable patterns, a specific pattern may be determined to be used depending on the allocated bandwidth. In addition, a field of enabling/disabling whether to apply the operations of Method 5-1 may be defined in a higher layer parameter such as RRC, and the operations of Method 5-1 may be enabled only when a specific condition is satisfied (e.g., when the SCS is 960 kHz or when the channel bandwidth is above 2 GHz).

Method 5-2) An OCC for increasing the MU-MIMO capacity and supporting rank 2 transmission may be configured.

As described above, the number of PT-RS samples may increase to support the PT-RS when the MU-MIMO capacity increase. Accordingly, the length of an OCC applied to the PT-RS may also needs to increase. In addition, a rule for mapping an OCC sequence with the increased length to each UE may also be required. Even when rank 2 transmission is supported in the UL DFT-s-OFDM mode, a rule for mapping each OCC sequence to each rank (or layer) may be required. In the legacy system, the maximum number of samples per group is defined as 4, and thus, the sequence of each of predetermined OCCs: length-2 OCC and length-4 OCC may be mapped according to the RNTI of each UE. Hereinafter, a method of allocating an OCC sequence to each UE or each rank will be described. When a length-N OCC is additionally introduced to support the PT-RS according to the increase in the MU-MIMO capacity (in this case, N is an integer greater than 4 and may be set as a multiple of 2), the OCC sequence mapped to each UE may be determined according to Equation 1.

$$\text{OCC sequence index} = \text{mod}(\text{RNTI of each } UE, N) \quad \text{[Equation 1]}$$

Alternatively, as a method of using the length-4 OCC without OCC addition and supporting rank 2 transmission, the OCC sequence for each rank may be allocated according to Equation 2.

$$\text{Sequence index for second rank} = \text{mod}(\text{sequence index} + n \text{ for first rank}, 4) \quad \text{[Equation 2]}$$

In this case, the sequence index for the first rank may be determined based on the RNTI of each UE. In Equation 2, the value of n may be predefined (e.g., n=1) for a specific frequency band (e.g., above 52.6 GHz) or a specific SCS (e.g., above 120 kHz SCS). The value of n may be semi-statically preconfigured by higher layer signaling such as RRC. The value of n may be dynamically indicated in DCI.

Method 5-3) The time-domain density of PT-RS symbols, the number of PT-RS groups, and/or the number of PT-RS samples may change according to radio channels and network scenarios.

In the legacy system, the time-domain density (L) of PT-RS symbols may be set to either 1 or 2 for the DFT-s-OFDM mode. That is, when L=1, the PT-RS may be transmitted in every symbol. When L=2, the PT-RS may be transmitted only in one of two consecutive DFT-s-OFDM symbols. For the symbol in which the PT-RS is transmitted, the number of groups may be set to 2, 4, or 8 and the number of samples per group may be set to 2 or 4. Accordingly, the PT-RS may be used for the DFT-s-OFDM symbol. In Method 5-3, the number of groups is denoted by X, and the number of samples per group is denoted by K.

On the other hand, if a larger SCS (e.g., 480 or 960 kHz) is introduced to current FR1/FR2 for NR operating above 60 GHz, the time length of the DFT-s-OFDM symbol may significantly decrease. Thus, the relative ratio between the length of one symbol and the coherence time may be different from that of FR1/FR2. In addition, due to a difference in used frequency bands, the time-varying characteristics of a transmission channel may also be different from those of current FR1/FR2. Accordingly, a PT-RS pattern when an SCS larger than the existing one is used in bands above 60 GHz will be described below. Specifically, new combinations as well as combinations of L, X, and K supported for the DFT-s-OFDM mode and configuration methods therefor will be described.

5-3-1) When a large SCS is used, the length of a symbol may significantly decrease in the time domain. As a result, it is possible to avoid PT-RS performance degradation without averaging and/or interpolating based on a plurality of PT-RS groups and samples. That is, the amount of PT-RSs may decrease by setting X=1 or K=1, and thus, more data (PUSCHs) may be transmitted. Whether the PT-RS performance degradation occurs may vary depending on PUSCH-related configurations such as the used frequency band (e.g., 60 GHz band) as well as the used SCS (e.g., above 120 kHz) and MCS (e.g., QPSK). Whether or not to change the PT-RS pattern may be configured based on the above conditions (e.g., use of a specific frequency band, a specific SCS, and/or a specific MCS). In addition, when the above conditions are satisfied, the BS (gNB) and UE may change the PT-RS pattern according to a predetermined rule. When the above conditions are satisfied, the BS/UE may transmit/receive indications dynamically/statically. As a specific embodiment thereof, when a PUSCH with a large SCS (e.g., 960 kHz) carries data based on QPSK in NR operating in high frequency bands (e.g., above 52.6 GHz), the UE may transmit the PT-RS with L=1, X=1, and K=2 according to a predetermined rule, and the BS may receive and process the PT-RS. Considering that L=1 corresponds to the configuration for transmitting the PT-RS in every symbol, L=1 may allow sufficient phase noise estimation/compensation, compared to when L>1. Therefore, it may be modified as follows: X=1 and K=2 or X=2 and K=1 to reduce the PT-RS overhead without degrading the reception performance of the receiver.

5-3-2) Due to the decrease in the symbol length, a plurality of symbols may be included within the coherence time. In this case, L may have a larger value than that supported by Rel-15/16, such as L=4. As the value of L increases, the ratio of PT-RSs to PUSCH data may decrease. Thus, the following methods may be used: a method of additionally transmitting PUSCH data by the reduced PT-RS amount; a method of increasing the signal-to-noise ratio (SNR) of PT-RS reception by increasing X by the reduced PT-RS amount, which is caused by the increase in the value of L; or a method of increasing the multiplexing capacity for PT-RS ports by increasing the value of K as much as the ratio due to the increase in the value of L. For example, if L=4, X=16, and K=4 are configured, the amount of PT-RS overhead of the legacy system may be maintained, and at the same time, the number of PT-RS groups included in one symbol may increase. Since the proposed method may vary depending on the PUSCH-related configurations such as the used frequency band (e.g., 60 GHz band) as well as the used SCS (e.g., above 120 kHz) and MCS (e.g., QPSK), whether or not to change the PT-RS pattern may be configured based on the above conditions (e.g., use of a specific frequency band, a specific SCS, and/or a specific MCS). In addition, when the above conditions are satisfied, the BS (gNB) and UE may change the PT-RS pattern according to a predetermined rule. When the above conditions are satisfied, the BS/UE may transmit/receive indications dynamically/statically.

5-3-3) To improve the performance of interpolation in a portion where there are no PTRS groups and/or samples, the value of X (=the number of PTRS groups) may increase. That is, the method of increasing the value of X compared to the legacy system may be included in or supplemented with the proposal for changing the PTRS pattern with X=1 or K=1 described in 5-3-1. Specifically, as described above in 5-3-1, when K is changed as follows: K=1, the number of samples per PTRS group may decrease, compared to the legacy system. Thus, the PTRS overhead may be reduced with respect to one symbol. Alternatively, if the value of X increases by a decrease in the value of K, the PTRS overhead may be maintained. Hereinafter, specific proposals will be described.

Considering the frequency band (e.g., above 52.6 GHz), SCS (e.g., 120 kHz), MCS (e.g., 64QAM) and allocated bandwidth (or number of RBs), a new PTRS pattern may be used with an increase in X.

That is, the performance of interpolation between PTRS groups within one DFT-s-OFDM symbol may be improved by increasing X. If the value of K decreases by an increase in the value of X, a PTRS pattern with the same overhead as that of the legacy system may be used. Alternatively, a PTRS pattern with increased overhead may be used. X may have other available values rather than 8 or 4, which is supported by the legacy system (e.g., X=16 and K=2 may be used instead of X=8 and K=4).

As in the legacy NR system, the PTRS pattern change may be predefined according to the allocated BW size (or the number of allocated RBs) in order to define the operations of the BS and UE. Alternatively, when a specific condition is satisfied, the PTRS pattern may change based on the frequency band, the allocated BW size, the configured SCS, and/or the configured MCS. For example, when a first UE is configured with the 120 kHz SCS and operates in bands below 52.6 GHz, a pattern of up to 8 PTRS groups (i.e. X=8) may be used depending on the allocated BW size. When a second UE is configured with the 120 kHz SCS and operates in bands above 52.6 GHz, the MCS may be additionally checked. If the MCS is above 64-QAM, a pattern of 16 PTRS groups (i.e., X=16) may be used. Regarding the operations of the two UEs, the second UE has a relatively large number of PTRS groups in one DFT-s-OFDM symbol. Accordingly, it may be expected that the second UE has a short interval between groups and excellent interpolation performance between groups. Additionally, if K=4 is configured in the pattern where X=16 is configured, the PTRS pattern may have overhead similar to that of the PTRS pattern supported by the legacy system. Further, if K=2 is configured, the overhead may decrease, compared to the legacy system. On the other hand, if K=8 is configured, the overhead may increase, compared to the legacy system.

Since the PTRS pattern change may vary depending on the PUSCH-related configurations such as the used frequency band (e.g., 60 GHz band) as well as the used SCS (e.g., above 120 kHz) and MCS (e.g., QPSK), whether or not to change the PT-RS pattern may be configured based on the above conditions (e.g., use of a specific frequency band, a specific SCS, and/or a specific MCS). In addition, when the above conditions are satisfied, the BS (gNB) and UE may change the PT-RS pattern according to a predetermined rule. When the above conditions are satisfied, the BS/UE may transmit/receive indications dynamically/statically.

Implementation Examples

Figure 10:
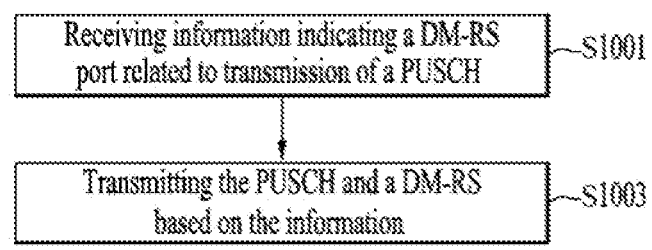

FIG. 10 is a flowchart of a signal transmission and reception method according to embodiments of the present disclosure.

Referring to FIG. 10, the embodiments of the present disclosure may be performed by a UE and include: receiving information indicating a DM-RS port related to transmission of a PUSCH (S1001); and transmitting the PUSCH and a DM-RS based on the information (S1003).

In FIG. 10, transmitting the PUSCH in step S1001 may be replaced with receiving a PDSCH. Transmitting the PUSCH and DM-RS in step S1003 may be replaced with receiving the PDSCH and DM-RS. In each step, the DM-RS may be replaced by a PTRS.

Based on the operations of FIG. 10, one or more of the operations described in Sections 1.1 to 1.5 may be performed in combination.

For example, according to Section 1.4, based on a determination that an FD-OCC is not applied to a DM-RS port indicated by information indicating the DM-RS port, the DM-RS may be transmitted after a change operation for the DM-RS port.

Specifically, according to Method 4-1, the change operation may include one or more of 4-1-1 to 4-1-3. For example, the change operation may include at least one of: based on the information indicating a first DM-RS port and a second DM-RS, an operation of configuring to use only the second DM-RS port among the first DM-RS port and the second DM-RS port; based on the information indicating the first DM-RS port and the second DM-RS port, an operation of configuring to use the first DM-RS port and a third DM-RS port except for the second DM-RS port; or based on the information indicating only the first DM-RS port, an operation of configuring to use the second DM-RS port rather than the first DM-RS port.

According to 4-1-4, DM-RS ports belonging to the same CDM group as the DM-RS port may not be allocated to other UEs.

In addition, according to method 4-2, a determination of whether to perform the change operation for the DM-RS port may be based on 4-2-1 to 4-2-6. For example, the determination of whether to perform the change operation for the DM-RS port may be received through higher layer signaling and/or DCI from a network. In addition, the determination of whether to perform the change operation for the DM-RS port may be determined by the UE based on a configured PUSCH mapping type, a configured DM-RS type, a configured PT-RS pattern, a configured ICI compensation scheme, a configured SCS, a configured MCS, the number of configured CDM groups, a configured DM-RS port, and/or whether SU-MIMO is configured, In FIG. 10, when transmitting the PUSCH and DM-RS is replaced with receiving the PDSCH and DM-RS, the configured PUSCH mapping type may be replaced with a configured PDSCH mapping type.

According to Method 4-3, that the DM-RS ports belonging to the same CDM group as the DM-RS port are not allocated to the other UEs may be indicated based on combinations of one or more of 4-3-1 to 4-3-5. For example, that the DM-RS ports belonging to the same CDM group as the DM-RS port are not allocated to the other UEs may be indicated by: an unused antenna port field value based on a PT-RS configuration; an unused antenna port field value based on a rank for the PUSCH transmission being smaller than or equal to a specific rank; and/or an unused antenna port field value based on that CDM based on the frequency-domain OCC is not applied to the DM-RS ports belonging to the CDM group.

In FIG. 10, when transmitting the PUSCH and DM-RS is replaced with receiving the PDSCH and DM-RS, the rank for the PUSCH transmission may be replaced with a rank for PDSCH reception.

The operations described with reference to FIG. 10 may be performed in combination with at least one of the operations described with reference to FIGS. 1 to 9 and/or the operations described in Section 1.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 11:
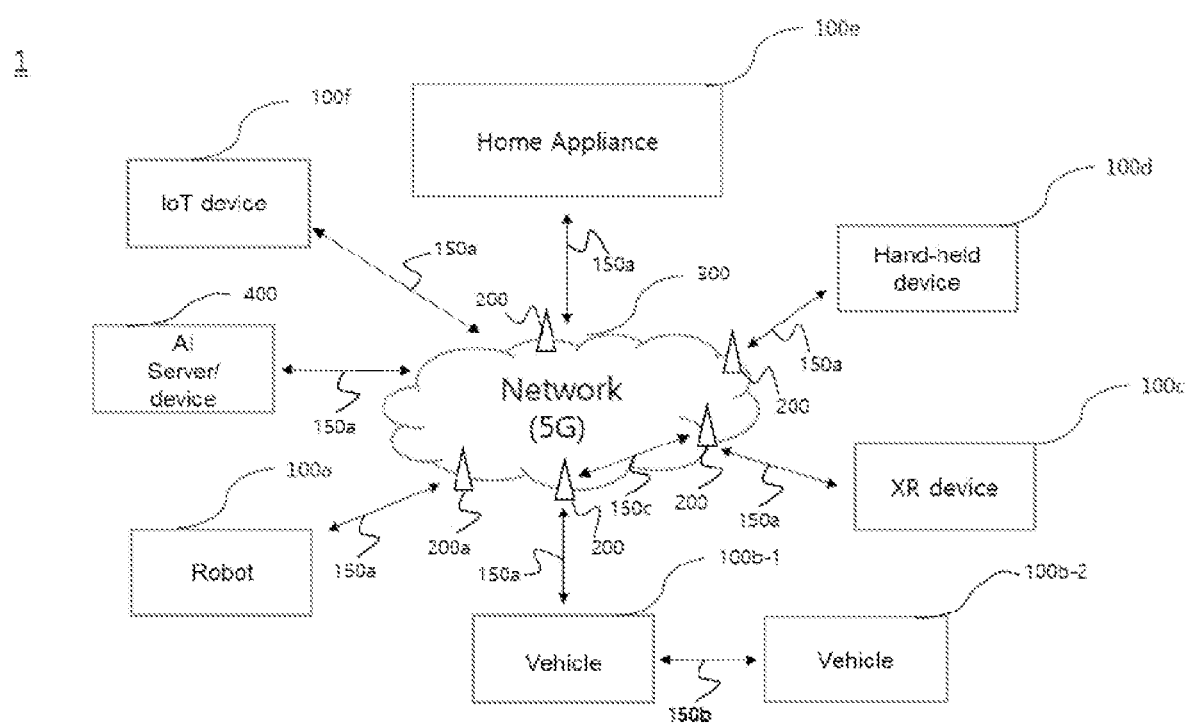
FIGS. 11 to 14 illustrate devices according to embodiments of the present disclosure.

FIG. 11 illustrates a communication system 1 applied to the present disclosure.

Referring to FIG. 11, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g., V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g., relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

Figure 12:
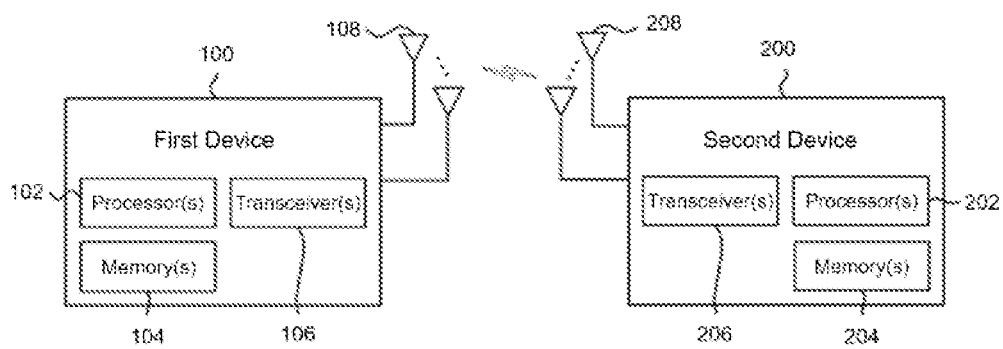

FIG. 12 illustrates wireless devices applicable to the present disclosure.

Referring to FIG. 12, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 11.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

Figure 13:
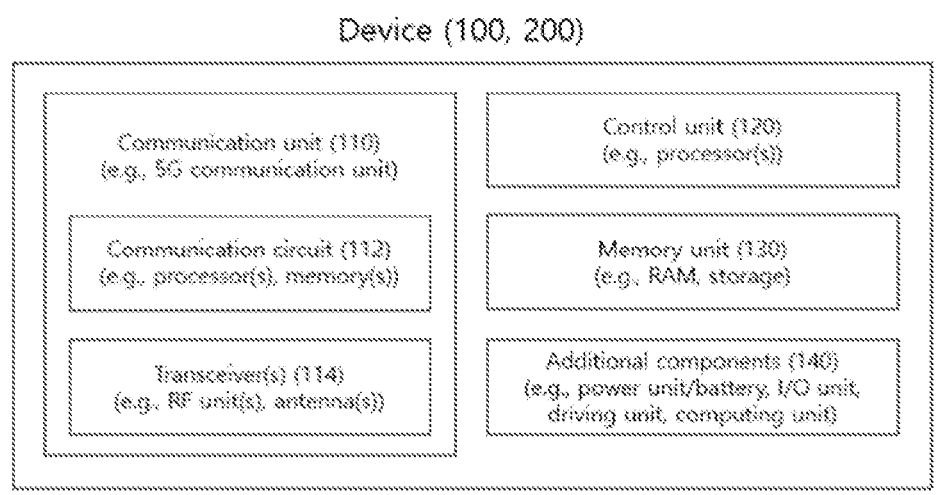

FIG. 13 illustrates another example of a wireless device applied to the present disclosure. The wireless device may be implemented in various forms according to a use case/service (refer to FIG. 11).

Referring to FIG. 13, wireless devices 100 and 200 may correspond to the wireless devices 100 and 200 of FIG. 12 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 11), the vehicles (100*b*-1 and 100*b*-2 of FIG. 11), the XR device (100*c* of FIG. 11), the hand-held device (100*d* of FIG. 11), the home appliance (100*e* of FIG. 11), the IoT device (100*f* of FIG. 11), a digital broadcasting terminal, a hologram device, a public safety device, an MTC device, a medical device, a FinTech device (or a finance device), a security device, a climate/environment device, the AI server/device (400 of FIG. 11), the BSs (200 of FIG. 11), a network node, or the like. The wireless device may be mobile or fixed according to a use case/service.

In FIG. 13, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 14:
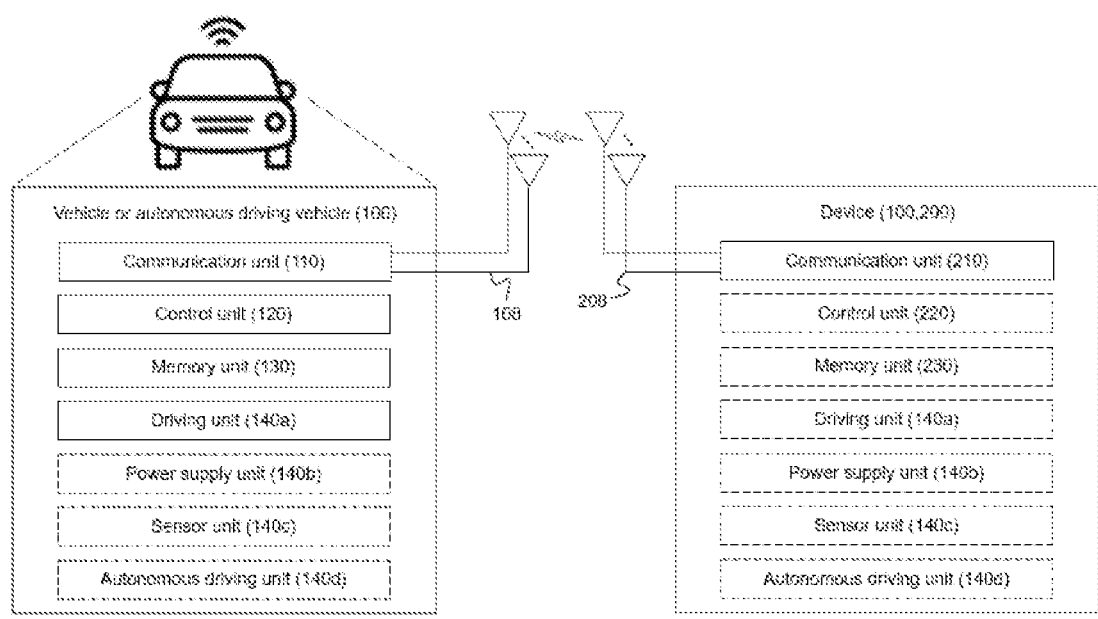

Example of Vehicle or Autonomous Driving Vehicle to which the Present Disclosure is Applied FIG. 14 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 14, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 13, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

As described above, the present disclosure is applicable to various wireless communication systems.

What is claimed is:

1. A method of transmitting and receiving a signal by a user equipment (UE) in a wireless communication system, the method comprising:
   receiving information about a demodulation reference signal (DM-RS) port related to reception of a physical downlink shared channel (PDSCH); and
   receiving the PDSCH and a DM-RS based on the information,
   wherein a DM-RS port from a same code division multiplexing (CDM) group is not associated with a transmission of PDSCH to another UE based on (i) a frequency domain orthogonal cover code (FD-OCC) being disable for the DM-RS port and (ii) the DM-RS port being a single DM-RS port.

2. The method of claim 1, wherein the change operation comprises:
   based on the information indicating a first DM-RS port and a second DM-RS port, an operation of configuring to use only the second DM-RS port among the first DM-RS port and the second DM-RS port;
   based on the information indicating the first DM-RS port and the second DM-RS port, an operation of configuring to use the first DM-RS port and a third DM-RS port except for the second DM-RS port; or based on the information indicating only the first DM-RS port, an operation of configuring to use the second DM-RS port rather than the first DM-RS port.

3. The method of claim 1, wherein DM-RS ports belonging to a same code division multiplexing (CDM) group as the DM-RS port are not allocated to other UEs.

4. The method of claim 1, wherein the determination is received through higher layer signaling and/or downlink control information (DCI) from a network, or
wherein the determination is based on a configured PDSCH mapping type, a configured DM-RS type, a configured phase tracking reference signal (PT-RS) pattern, a configured inter-carrier interference (ICI) compensation scheme, a configured subcarrier spacing (SCS), a configured modulation and coding scheme (MCS), a number of configured code division multiplexing (CDM) groups, a configured DM-RS port, and/or whether single-user multiple-input multiple-output (SU-MIMO) is configured.

5. The method of claim 3, wherein that the DM-RS ports belonging to the same CDM group as the DM-RS port are not allocated to the other UEs is indicated by:
an unused antenna port field value based on a phase tracking reference signal (PT-RS) configuration;
an unused antenna port field value based on a rank for the PDSCH reception being smaller than or equal to a specific rank; and/or
an unused antenna port field value based on that CDM based on the frequency-domain OCC is not applied to the DM-RS ports belonging to the CDM group.

6. A user equipment (UE) configured to transmit and receive a signal in a wireless communication system, the UE comprising:
at least one transceiver;
at least one processor; and
at least one memory operably connected to the at least one processor and configured to store instructions that, when executed, cause the at least one processor to perform operations comprising:
receiving information about a demodulation reference signal (DM-RS) port related to reception of a physical downlink shared channel (PDSCH); and
receiving the PDSCH and a DM-RS based on the information,
wherein a DM-RS port from a same code division multiplexing (CDM) group is not associated with a transmission of PDSCH to another UE based on (i) a frequency domain orthogonal cover code (FD-OCC) being disable for the DM-RS port and (ii) the DM-RS port being a single DM-RS port.

7. The UE of claim 6, wherein the change operation comprises:
based on the information indicating a first DM-RS port and a second DM-RS, an operation of configuring to use only the second DM-RS port among the first DM-RS port and the second DM-RS port;
based on the information indicating the first DM-RS port and the second DM-RS port, an operation of configuring to use the first DM-RS port and a third DM-RS port except for the second DM-RS port; or
based on the information indicating only the first DM-RS port, an operation of configuring to use the second DM-RS port rather than the first DM-RS port.

8. The UE of claim 6, wherein DM-RS ports belonging to a same code division multiplexing (CDM) group as the DM-RS port are not allocated to other UEs.

9. The UE of claim 6, wherein the determination is received through higher layer signaling and/or downlink control information (DCI) from a network, or wherein the determination is based on a configured PDSCH mapping type, a configured DM-RS type, a configured phase tracking reference signal (PT-RS) pattern, a configured inter-carrier interference (ICI) compensation scheme, a configured subcarrier spacing (SCS), a configured modulation and coding scheme (MCS), a number of configured code division multiplexing (CDM) groups, a configured DM-RS port, and/or whether single-user multiple-input multiple-output (SU-MIMO) is configured.

10. The UE of claim 8, wherein that the DM-RS ports belonging to the same CDM group as the DM-RS port are not allocated to the other UEs is indicated by:
an unused antenna port field value based on a phase tracking reference signal (PT-RS) configuration;
an unused antenna port field value based on a rank for the PDSCH reception being smaller than or equal to a specific rank; and/or
an unused antenna port field value based on that CDM based on the frequency-domain OCC is not applied to the DM-RS ports belonging to the CDM group.

11. A method of transmitting and receiving a signal by base station in a wireless communication system, the method comprising:
transmitting information about a demodulation-reference signal (DM-RS) port related to a reception of a physical downlink shared channel (PDSCH) by a user equipment (UE); and
transmitting the PDSCH and the DM-RS based on the information,
wherein a DM-RS port from a same code division multiplexing (CDM) group is not associated with a transmission of PDSCH to another UE based on (i) a frequency domain orthogonal cover code (FD-OCC) being disable for the DM-RS port and (ii) the DM-RS port being a single DM-RS port.

12. A base station configured to transmit and receive a signal in a wireless communication system, the base station comprising:
at least one transceiver;
at least one processor; and
at least one memory operably connected to the at least one processor and configured to store instructions that, when executed, cause the at least one processor to perform operations comprising:
transmitting information about a demodulation-reference signal (DM-RS) port related to a reception of a physical downlink shared channel (PDSCH) by a user equipment (UE); and
transmitting the PDSCH and the DM-RS based on the information, wherein a DM-RS port from a same code division multiplexing (CDM) group is not associated with a transmission of PDSCH to another UE based on (i) a frequency domain orthogonal cover code (FD-OCC) being disable for the DM-RS port and (ii) the DM-RS port being a single DM-RS port.

* * * * *